(12) United States Patent
Hollenbeck et al.

(10) Patent No.: US 7,299,299 B2
(45) Date of Patent: Nov. 20, 2007

(54) SHARED REGISTRATION SYSTEM FOR REGISTERING DOMAIN NAMES

(75) Inventors: Scott Hollenbeck, Burke, VA (US); Manoj Srivastava, Reston, VA (US); David Holtzman, Herndon, VA (US); Neeran Saraf, Falls Church, VA (US)

(73) Assignee: Network Solutions, Inc., Herndon, VA (US)

( * ) Notice: Subject to any disclaimer, the term of this patent is extended or adjusted under 35 U.S.C. 154(b) by 35 days.

(21) Appl. No.: 11/014,709

(22) Filed: Dec. 20, 2004

(65) Prior Publication Data

US 2005/0102354 A1 May 12, 2005

Related U.S. Application Data

(63) Continuation of application No. 09/556,830, filed on Apr. 21, 2000, now abandoned.

(60) Provisional application No. 60/130,568, filed on Apr. 22, 1999.

(51) Int. Cl.
*G06F 15/16* (2006.01)
(52) U.S. Cl. ..................................................... 709/245
(58) Field of Classification Search ................ 709/203, 709/217–219, 223, 245
See application file for complete search history.

(56) References Cited

U.S. PATENT DOCUMENTS

| | | | |
|---|---|---|---|
| 6,119,234 A | 9/2000 | Aziz et al. ................... 713/201 |
| 6,182,142 B1 * | 1/2001 | Win et al. .................... 709/229 |
| 6,230,194 B1 | 5/2001 | Frailong et al. ............. 709/220 |
| 6,324,538 B1 | 11/2001 | Wesinger et al. ............. 707/10 |
| 6,338,082 B1 | 1/2002 | Schneider .................... 709/203 |
| 6,374,295 B2 * | 4/2002 | Farrow et al. ............... 709/223 |
| 6,418,466 B1 | 7/2002 | Bertram et al. ............. 709/221 |
| 6,560,634 B1 * | 5/2003 | Broadhurst .................. 709/203 |

OTHER PUBLICATIONS

Hollenbeck et al., NSI Registry Registrar Protocol (RRP Version 1.1.0, May 2000, RFC 2832, Network Solutions, Inc. Registry, pp. 1-31.*
K. Crispin et al.: *Shared Registry System Protocol (SRSP)*, Nov. 1998, pp. 1-31, http://www.globecom.net/ietf/draft/draft-crispin-srs-00.html, retrieved Feb. 7, 2003.

* cited by examiner

*Primary Examiner*—Jason Cardone
*Assistant Examiner*—Minh Chau Nguyen
(74) *Attorney, Agent, or Firm*—Townsend and Townsend and Crew, LLP

(57) ABSTRACT

An apparatus and method for processing a domain name registration operation in a shared registration system is provided. A registry receives a request for performing a domain name registration operation from a registrar. The registry performs an authentication of the registrar that sent the request. If the registrar is determined to be authenticated, the registry then determines whether the registrar is authorized to perform an action necessitated by the operation. Subsequently, the registry executes the operation based on a determination that the registrar is authorized and stores changes necessitated by the operation in a database. A response indicating success or failure of the operation is sent to the registrar.

15 Claims, 15 Drawing Sheets

SHARED REGISTRATION SYSTEM FOR REGISTERING DOMAIN NAMES

This is a continuation of application Ser. No. 09/556,830 filed 21 Apr. 2000 now abandonded, the content of which is incorporated herein by reference in its entirety.

RELATED APPLICATION

This application claims the benefit of U.S. Provisional Application No. 60/130,568, filed Apr. 22, 1999, the disclosure of which is expressly incorporated herein by reference in its entirety.

FIELD OF THE INVENTION

The present invention relates to the field of domain name registration. More particularly, the invention relates to an apparatus and method for providing a shared registration system for registering domain names.

BACKGROUND OF THE INVENTION

The World Wide Web allows for the access of information on the Internet by permitting a user to navigate Internet resources without the user having knowledge of specific Internet Protocol (IP) addresses or other technical knowledge. The Web does away with command-line utilities, which typically require a user to transmit sets of commands to communicate with an Internet server. Instead, the Web is made up of thousands of interconnected web sites.

In order to access a web site, a user utilizes a uniform resource locator (URL) or domain name associated with the site. Because there are so many web sites in existence today and the number of web sites is always increasing, a domain name must first be registered with a domain name registration service. In that manner, it can be ensured that two web sites owned by two different people will not have the same domain name.

A domain name registration service is responsible for accepting a request for a domain name from an individual or a corporation (e.g., registrant) and determining whether or not the domain name is already in use by somebody else. If the domain name is already taken, then the requester must choose a different domain name. If the domain name is available, then the requester is allowed to exclusively use the name and have it registered and stored in a database that maintains all of the domain names currently registered with that domain name registration service.

Previously, one domain name registration service, owned by Network Solutions, Inc., provided for the registration of all second-level domain (SLD) names in the .com, .org, .net, .edu, .gov, and mil top level domain (TLD) names. The database maintained by the service was a global database that stored information that could be propagated in Internet zone files on the Internet so that domain names could be found and accessed by users around the world. Network Solutions, Inc. was allowed to be the sole provider of registration services pursuant to a bid won for a five-year National Science Foundation (NSF) Cooperative Agreement.

As more businesses and individuals adopted the Internet, the registration of domain names grew significantly. The rapid adoption of the world wide web and the explosion in domain name registration led the government to believe that competition should be introduced at the retail level in the registration of domain names. Accordingly, there is presently a need for a system and method capable of accommodating an unlimited number of registration retailers, e.g., registrars, which are each responsible for registrant acquisition and user support, while keeping a global database for certain TLD names under the control of a single experienced entity for stability and security.

SUMMARY OF THE INVENTION

A method consistent with the present invention processes a domain name registration operation in a shared registration system. The method includes the steps of: generating a request for performing a domain name registration operation; sending the request to a registry, wherein the registry is operable to receive the request, authenticate a registrar that sent the request, determine whether the registrar is authorized to perform an action necessitated by the operation, execute the operation based on a determination that the registrar is authorized, and store changes necessitated by the operation in a database; and receiving a response to the request, the response indicating success or failure of the operation.

Another method consistent with the present invention processes a domain name registration operation in a shared registration system. The method includes the steps of: receiving a request for performing a domain name registration operation; authenticating a registrar that sent the request; sending the request to an application server based on a determination that the registrar is authenticated, wherein the application server is operable to execute the operation; receiving a response to the request, the response indicating success or failure of the operation; and forwarding the response to the registrar.

Another method consistent with the present invention processes a domain name registration operation in a shared registration system. The method includes the steps of: receiving a request for performing a domain name registration operation; parsing the request; instantiating one or more objects, the objects corresponding to attributes included in the request; determining whether a registrar that sent the request is authorized to perform an action necessitated by the operation; executing the operation based on a determination that the registrar is authorized; storing changes necessitated by the operation in a database; and sending a response to the registrar, the response indicating success or failure of the operation.

Another method consistent with the present invention processes a domain name registration operation in a shared registration system. The method includes the steps of: receiving a request for performing a domain name registration operation; authenticating a registrar that sent the request; instantiating one or more objects, the objects corresponding to parameters included in the request; determining whether the registrar is authorized to perform an action necessitated by the operation; executing the operation based on a determination that the registrar is authorized; storing changes necessitated by the operation in a database; and sending a response to the registrar, the response indicating success or failure of the operation.

Another method consistent with the present invention processes a domain name registration operation in a shared registration system. The method includes the steps of: receiving a request for performing a domain name registration operation; authenticating a registrar that sent the request; determining whether the registrar is authorized to perform an action necessitated by the operation; executing the operation based on a determination that the registrar is authorized; storing changes necessitated by the operation in a database; and sending a response to the registrar, the response indicating success or failure of the operation.

Another method consistent with the present invention processes a domain name registration operation in a shared registration system. The method includes the steps of: receiving a request for performing a domain name registration operation; determining whether a registrar that sent the request is authorized to perform an action necessitated by the operation; executing the operation based on a determination that the registrar is authorized; storing changes necessitated by the operation in a database; and sending a response to the registrar, the response indicating success or failure of the operation.

An apparatus consistent with the present invention processes a domain name registration operation. The apparatus comprises the following: a memory having a program that: generates a request for performing a domain name registration operation; sends the request to a registry, wherein the registry is operable to receive the request, authenticate a registrar that sent the request, determine whether the registrar is authorized to perform an action necessitated by the operation, execute the operation based on a determination that the registrar is authorized, and store changes necessitated by the operation in a database; and receives a response to the request, the response indicating success or failure of the operation; and a processor that runs the program.

Another apparatus consistent with the present invention processes a domain name registration operation. The apparatus comprises the following: a memory having a program that: receives a request for performing a domain name registration operation; authenticates a registrar that sent the request; sends the request to an application server based on a determination that the registrar is authenticated, wherein the application server is operable to execute the operation; receive a response to the request, the response indicating success or failure of the operation; and forward the response to the registrar; and a processor that runs the program.

Another apparatus consistent with the present invention processes a domain name registration operation. The apparatus comprises the following: a memory having a program that receives a request for performing a domain name registration operation; parses the request; instantiates one or more objects, the objects corresponding to attributes included in the request; determines whether a registrar that sent the request is authorized to perform an action necessitated by the operation; executes the operation based on a determination that the registrar is authorized; stores changes necessitated by the operation in a database; and sends a response to the registrar, the response indicating success or failure of the operation; and a processor that runs the program.

Another apparatus consistent with the present invention processes a domain name registration operation. The apparatus comprises the following: a database for storing domain name registration information; an application gateway operable to receive a request for performing a domain name registration operation, authenticate a registrar that sent the request, receive a response to the request, and forward the response to a registrar that sent the request; and an application server operable to receive the request from the application gateway, parse the request, instantiate one or more objects, the objects corresponding to attributes included in the request, determine whether the registrar is authorized to perform an action necessitated by the operation, execute the operation based on a determination that the registrar is authorized, store changes necessitated by the operation in the database, and send a response to the registrar via the application gateway, the response indicating success or failure of the operation.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Overview

The apparatus and method of the present invention processes domain name registration operations in a shared registration system comprising a plurality of registrars providing internet domain name registration services within the TLDs administered by a registry. Registrars access the registry through a registry-registrar protocol (RRP) to register domain names and perform domain name-related functions such as the registration of name servers, renewal of registrations, deletions, transfers, and updates to domain names registered by that registrar. Registrars have a web-based interface to access the registry to perform administrative functions, generate reports, perform global domain name updates, and perform other self-service maintenance functions not available via RRP. The RRP is implemented by the registry to provide adequate security and authentication functions to protect the registry database while supporting all necessary registrar operations.

The registry accepts registrations and registration service requests from all registrars licensed with the registry, while protecting the integrity of registrations from unauthorized access and interference by third parties. Every new domain name application is checked to ensure that the domain name is not already registered. The registry generates zone files for the TLDs it administers and provides a whois search capability that allows users to query the availability of a domain name. Zone files generally contain the information needed to resolve domain names to Internet Protocol (IP) numbers. The registry also provides support to the registrars through customer service representatives (CSRs). The CSRs have a separate web-based interface to the registry, through which, after authenticating the registrar, they can query and perform updates per the registrar's requests.

Shared Registration System Architecture

Figure 1:
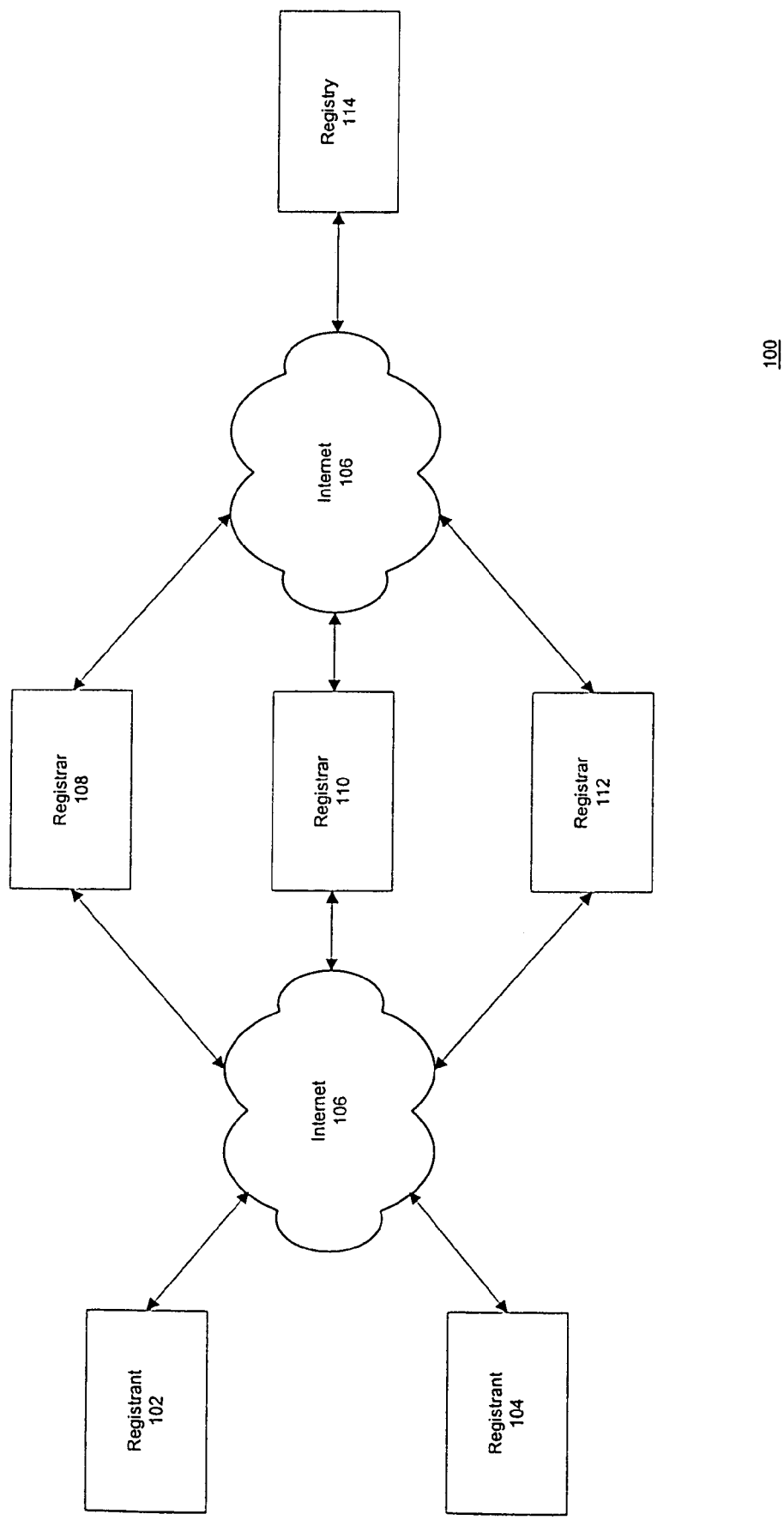
FIG. 1 is a diagram of an exemplary network environment in which a method and system consistent with the present invention may be implemented.

FIG. 1 is a diagram of an exemplary network environment 100 in which a method consistent with the present invention may be implemented. Network environment 100 includes registrants 102 and 104, Internet 106, registrars 108, 110, and 112, and registry 116.

Registrant 102 or 104 may include, for example, a personal computer of an individual or corporation that may want to register a domain name with a domain name registration system such as registrar 108, 110, or 112. This individual or corporation holds the right to use that specific domain name for a specified period of time, provided certain conditions are met and the registration fees are paid.

Registrar 108, 110, or 112 may be a domain name registration service such as that maintained by Network Solutions, Inc. that provides direct services to registrants 102 or 104. Registrant 102 or 104 may access registrar 108, 110, or 112 via Internet 106 through a web server resident on registrar 108, 110, or 112. The web server may host the registrar's web page and is utilized by registrant 102 or 104 to purchase or manage the various options that are associated with a domain name registration system account. For example, using the various web pages available at registrar 108, registrant 102 may sign up for an account, reserve or register a domain name, buy the web forwarding option, configure the web forwarding option (e.g., determine where a given web address will forward), buy electronic mail (e-mail) service, buy a single page business card, contact a customer service representation, etc.

The web forwarding option, for example, forwards a web address hosted by a registrar to a pre-existing URL. The e-mail service, for example, matches a registrants's e-mail address with a given domain name so that e-mail can be sent and received using a desired name (e.g., a company name) instead of the name of, for example, an e-mail vendor. The single page business card, for example, forwards a web address to a single page web site designed by registrant 102 or 104.

Registrars 108, 110, and 112 function to process domain name registrations for registrants and then send the necessary DNS information to registry 114 for entry into a centralized registry database and ultimate propagation over the Internet. DNS information may include, for example, domain name, name server names, and name server Internet Protocol (IP) numbers. Communication between registrars 108, 110, and 112, and registry 114 occurs via a protocol called registry-registrar protocol (RRP). RRP is a protocol that permits multiple registrars to provide second level Internet domain name registration services in the top level domains (TLDs) administered by a TLD registry, such as registry 114, on behalf of registrants, such as registrant 102 or 104. Registrar 108, 110, or 112 may access registry 114 through RRP to register domain names and perform other domain name-related functions such as the registration of name servers, re-registrations, deletions, transfers, and updates to domain names registered by that registrar. In one embodiment, RRP may be a secure, TCP (transmission control protocol)-based, ASCII text protocol.

Registry 114 may be an entity that receives DNS information from registrars 108, 110, or 112, inserts that information into a centralized database resident at registry 114, and propagates the information in Internet zone files on the Internet so that domain names can be found by users around the world via applications such as the world wide web and e-mail. Generally, a registry is responsible for delegating Internet addresses, such as Internet Protocol (IP) numbers and domain names, and keeping a record of those addresses and the information associated with their delegation. Examples of domain name registries include NSI's registry operation (e.g., .com, .net, and .org) and the ISO 3166 country code registries (e.g., fr, de, uk, us). Registry 114 maintains at least the DNS information and an identifier for the registrar responsible for each domain name registered through registry 114. Registrant-specific data such as registrant name and contact information is not maintained by registry 114 but rather by the registrar or the particular domain name or name server.

Figure 2:
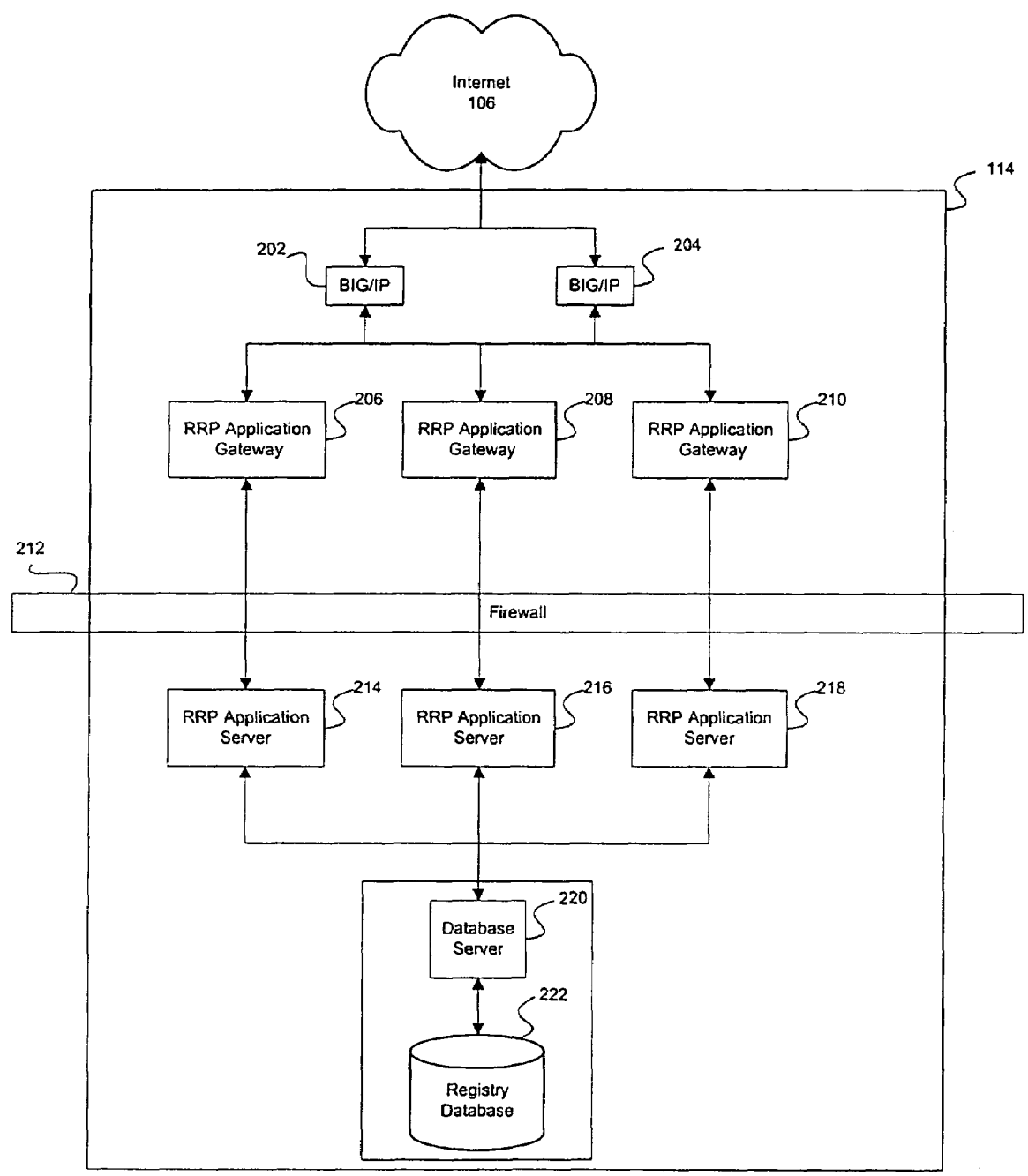
FIG. 2 is a diagram showing a partially expanded view of a registry consistent with the present invention.

FIG. 2 is a diagram showing a partially expanded view of registry 114 consistent with the present invention. Registry 114 may include BIG/IP 202, BIG/IP 204, RRP application gateways 206, 208, and 210, firewall 212, RRP application servers 214, 216, and 218, database server 220, and registry database 222.

BIG/IPs 202 and 204 are fully fault-tolerant servers that load balance the communications to RRP application gateways 206, 208, and 210. For example, registrar 108 may send registry 114 a RRP command to register a domain name with registry 114. The RRP command travels from registrar 108 through Internet 106 to BIG/IP 202 or 204, so that the RRP command can be passed to one of RRP application gateway 206, 208, or 210. Essentially, BIG/IPs 202 and 204 balance the load between RRP application gateways 206, 208, and 210 by, for example, alternating between the RRP application gateways to which BIG/IPs 202 and 204 send data. If one RRP application gateway is too busy, then data can be sent to another RRP application gateway. In this manner, bottlenecking of data can be avoided. It should be understood that the number of RRP application gateways connected to BIG/IPs 202 and 204 can be expanded as needed (e.g., if web traffic goes over the limit, more RRP application gateways can be added to stop congestion).

BIG/IPs 202 and 204 can be implemented, for example, using a SunServer machine available from Sun Microsystems. In one embodiment, communications between the registrars and BIG/IPs 202 and 204, and the communications between BIG/IPs 202 and 204 and RRP application gateways 206, 208, and 210 may be implemented, for example, according to RRP over SSL (secure socket layer) over TCP/IP protocol.

RRP application gateways 206, 208, and 210 are gateways to RRP application servers 214, 216, and 218 from the outside world. The primary purpose of RRP application gateways 206, 208, and 210 is to provide transport layer security. RRP application gateways 206, 208, and 210 authenticate registrars that are attempting to communicate with registry 114 using a mutual authentication technique known as SSL handshake. After successfully authenticating a registrar, an RRP application gateways 206, 208, or 210 decrypts the data received from the registrar and opens a dedicated connection with the RRP application server 214, 216, or 218 that is connected to the particular RRP application gateway. The RRP application gateway 206, 208, or 210 may then pass the data from the registrar on to the corresponding RRP application server through firewall 212 and subsequently acts as a proxy between the registrar and the RRP application server 214, 216, or 218. Communications between RRP application gateways 206, 208, and 210 and RRP application servers 214, 216, and 218 may be implemented, for example, according to RRP over TCP/IP protocol. In one embodiment, RRP application gateways 206, 208, and 210 may each be implemented using an Enterprise 450 server available from Sun Microsystems, running Solaris 2.6 and JDK 1.1.6.

RRP application servers 214, 216, and 218 provide the "heart" of the RRP environment. Each RRP application server 214, 216, and 218 is connected to a single RRP application gateway for communication. Alternatively, RRP application servers 214, 216, and 218 may be load balanced in a manner similar to the load balancing of RRP application gateways 206, 208, and 210. Upon receiving a RRP command from a RRP application gateway, a RRP application server 214, 216, or 218 processes and executes the RRP command in the context of an authenticated RRP session. The execution of the RRP command may include sending database changes to database server 220 so that the changes may be stored in registry database 222. After execution has been completed, the RRP application server may return a response code to a RRP application gateway, so that the RRP application gateway may return the response code to the registrar that initiated the RRP session. Communications between RRP application servers 214, 216, and 218 and database server 220 may be implemented, for example, according to JDBC (Java Database Connection) over TCP/IP protocol. In one embodiment, RRP application servers 214, 216, and 218 may each be implemented using an Enterprise 450 server available from Sun Microsystems, running Solaris 2.6 and JDK 1.1.6.

Database server 220 receives database changes from an RRP application server and stores the changes in registry database 222. The changes may be in the form of insertions, updates, or deletions. Database server 220 also runs a number of batch processes that may be run on a pre-scheduled basis using a cron-like scheduler. These batch processes may include, for example, a domain renewal process, a domain transfer notification process, an automatic domain transfer acknowledgment process, and an explicit delete process. In one embodiment, each of the batch processes is implemented in the Java® programming language.

The domain renewal process renews all of the domain names that have expired and are eligible for renewal. The domain transfer notification process sends notification to a registrar who has requested to transfer a domain name from another registrar informing them that their request is pending approval of the original registrar. Additionally, the notification process sends a notification to the original registrar informing them of the transfer request and asking them to either approve or disapprove the transfer request. The automatic domain transfer acknowledgment process searches for all domain names that are pending transfer and transfers them after a configurable amount of time (e.g., five days). The explicit delete process deletes all domains and child name servers that have been put on a hold status due to a RRP command to delete a domain name.

Note that these batch processes may affect several of the tables stored in registry database 222. These tables may include, for example, the domain table, the registrar table, the e-mail queue table, the domain pending transfer table, the transaction table, the transaction attribute table, and the various audit tables that are associated with the aforementioned tables. Other tables may also be affected. The tables stored in registry database 222 are more fully explained below.

Figure 10:
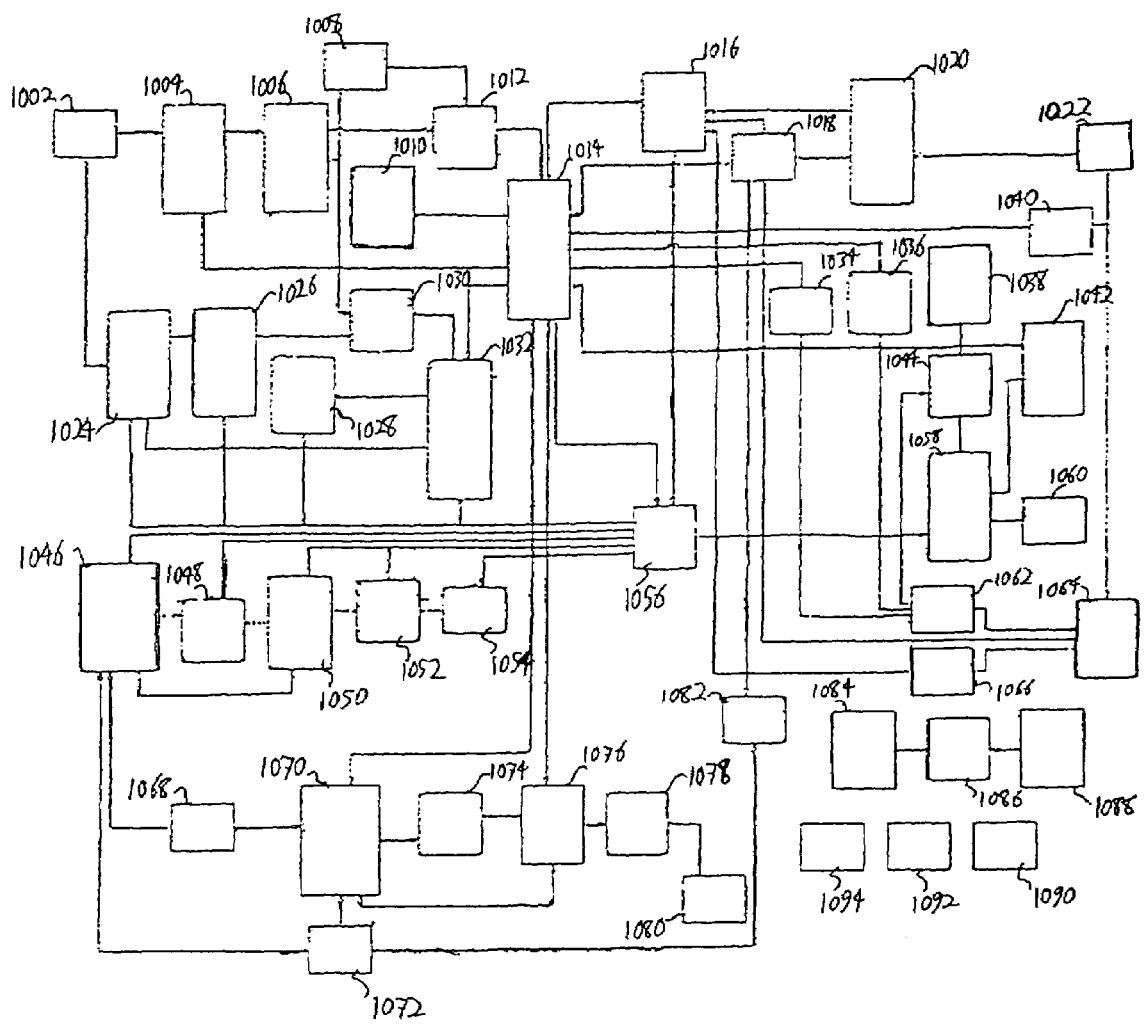
FIG. 10 is a diagram of the schema for a registry database consistent with the present invention.

Registry database 222 stores various information on domain name registrations, name server registrations, and registrars. Registry database 22 servers as a global or centralized database for all registrations for TLDs controlled by registry 114. Information stored on domain name registrations may include the following: domain name, name server, registrar name transfer date, registration period, expiration date, status, created date, created by, updated date, and updated by. Information stored on name server registrations may include the following: server name, IP address, registrar name, transfer date, created date, created by, updated date, and updated by. Information stored on registrars may include the following: registrar name, logon ID, registrar password, security phrase, status, credit limit, license expiration date, address, phone number, fax number, created date, created by, updated date, updated by, and registrar contact information. Registry database 222 may store the various information in the form of one or more relational tables. When execution of a RRP command or batch process results in a change in registry database 222, these tables may be altered. FIG. 10 shows the database schema for registry database 222. Using the RRP or a secured web site, each registrar may view the information stored in registry database 222 that pertains to its own registrations. Information on registrations made by other registrars is not viewable in that manner, although limited information is available for public viewing using a whois function. The whois function is described in greater detail below. In one embodiment, registry database 222 may be an Oracle 7.3.4 database.

Figure 3:
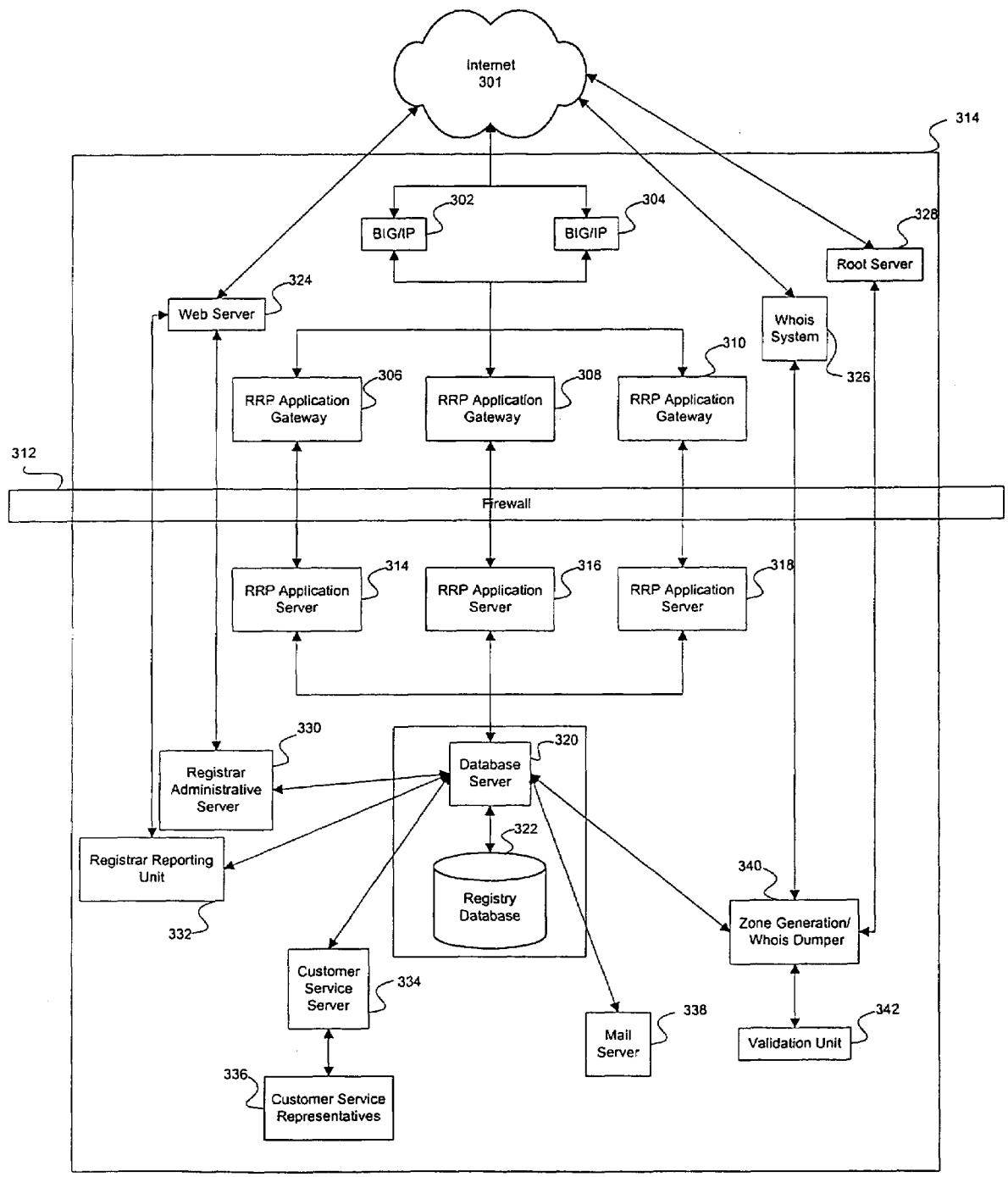
FIG. 3 is a diagram showing a partially expanded view of another registry consistent with the present invention.

FIG. 3 is a diagram showing a partially expanded view of another registry 314 consistent with the present invention. Registry 314 may include BIG/IP 302. BIG/IP 304, RRP application gateways 306, 308, and 310, firewall 312, RRP application servers 314, 316, and 318, database server 320, registry database 322, web server 324, whois system 326, root server 328, registrar administrative server 330, registrar reporting unit 332, customer service server 334, customer service representatives 336, mail server 338, zone generation/whois dumber 340, and validation unit 342. BIG/IP 302, BIG/IP 304, RRP application gateways 306, 308, and 310, firewall 312, RRP application servers 314, 316, and 318, database server 320, and registry database 322 operate in a manner similar to BIG/IP 202, BIG/IP 204, RRP application gateways 206, 208, and 210, firewall 212, RP application servers 214, 216, and 218, database server 220, and registry database 222, respectively.

Zone generation/whois dumper 340 extracts certain data from registry database 322 needed to create zone files and whois data. Zone files generally contain the information needed to resolve domain names in Internet Protocol (IP) numbers. For example, a zone file may include domain name information, name server information, and IP address information. Accordingly, in one embodiment, zone generation/whois dumper 340 may periodically (e.g., once a day) extract domain name, name server, and IP address information from the relational tables stored in registry database 322. In an alternative embodiment, data for zone files may be extracted from registry database 322 as soon as data becomes available on a real-time basis. Zone generation/whois dumper 340 then generates zone file(s) from the extracted information and sends the file(s) to validation unit 342 in order to check the validity of the data. Alternatively, zone validation may occur at zone generation/whois dumper 340. Upon receiving an indication that the zone file data is valid, zone generation/whois dumper 340 stores the file(s) on a database resident at root server 328 or another DNS server (not shown), where the file(s) are available for propagation across Internet 301. If desired, the zone file(s) may be encrypted before being sent to the root server 328 and/or the DNS servers.

Zone generation/whois dumper 340 also extracts data necessary for the whois feature offered by registry 314. Whois is a service that enables registrants and potential registrants to check the availability for registration of a selected domain name. Whois also enables Internet users to identify the registrar controlling a domain name. Whois enables these checks by providing information about registered domain names, including its registrar, DNS servers, creation time, and last update time. The user may then go to the identified registrar for additional data concerning the domain name registrant. A whois query can be performed, for example, on a fully qualified domain name or an IP address.

Zone generation/whois dumper 340 periodically (e.g., once a day) extracts data from registry database 322 so that the data may be sent to whois system 326 for use by the whois feature. In an alternative embodiment, whois data may be extracted from registry database 322 as soon as data becomes available on a real-time basis. The extracted data may include, for example, information stored in relational tables in registry database 322 pertaining to registrars, domain names, name servers, and IP addresses. After extracting data from registry database 322 and before sending this data to whois system 326, zone generation/whois dumper 340 may validate the extracted data either locally or at validation unit 342. Subsequently, zone generation/whois dumper 340 sends the various whois data to whois system 326 where the data is made available to registrars, registrants, and other Internet users.

Registrar reporting unit 332 functions to periodically provide a set of reports to the registrars that have information stored at registry 314. These reports may provide any information that may be useful to the registrars. For example, registrar reporting unit 332 may generate a report listing all domain names and name server that were transferred to other registrars since the last transfer report, a report listing all of the domain names and name servers currently registered by the registrar, or a report listing all of the domain names registered by the registrar that will expire in a predetermined time period. To produce the reports, registrar reporting unit 332 periodically extracts data relevant to various types of reports from registry database 322 and stores the data in a database resident in registrar reporting unit 332. A report generator resident in registrar reporting unit 332 periodically generates a set of reports using data extracted from the database in registrar reporting unit 332. The report generator subsequently sends the reports to the relevant registrars via web server 324, which communicates directly with the registrars. Alternatively, reports may be generated on an ad-hoc basis. For example, if a registrar desires a particular type of report from registrar reporting unit 332, the registrar may send a request for such a report to registrar reporting unit 332 where the report may be generated and returned to the registrar within a pre-specified period from the request date.

Registry 314 provides registrars support by making customer service representatives 336 available using customer service server 334. For example, customer service server 334 allows customer service representatives 336 to receive a registrar's status, modify domain names on behalf of the registrars, add name servers on behalf of the registrars, review a registrar's billing status, perform online payments on behalf of the registrars using credit card payments, generate reports requested by the registrars, etc. In one embodiment, customer service server 334 may comprise a web server which hosts the tools needed to implement the various aforementioned function and a server, such as a CORBA server, for sending data to and receiving data from registry database 322. Communications between customer service center 334 and database server 320 may be implemented, for example, according to JDBC over TCP/IP protocol. Communications between customer service center 334 and customer service representatives 336 may be implemented, for example, according to HTTP (hypertext transfer protocol).

Many of the functions provided by customer service server 334 may also implemented by the registrars themselves by accessing registrar administrative server 330 via web server 324. Registrar administrative server 330 enables registrars to perform administrative tasks such as updating its contact information and registrar address, viewing its billing status, performing online payment, and other administrative tasks. Registrars may also be able to perform global updates utilizing registrar administrative server 330. Communications between registrar administrative server 330 and database server 320 may be implemented, for example, according to JDBC over TCP/IP protocol. Communications between registrar administrative server 330 and web server 324 may be implemented, for example, according to DRP (Dynamo Request Protocol).

Mail server 338 may be an electronic mail (e-mail) server that sends e-mails to registrars to notify them of important information. For example, in response to the domain transfer notification batch process executing after a registrar requests a domain transfer, database server 320 may cause an e-mail notification to be sent to the registrar via mail server 338 informing the registrar that their request is pending approval of the original registrar. Other e-mail notifications may be sent to registrars as needed.

Figure 4:
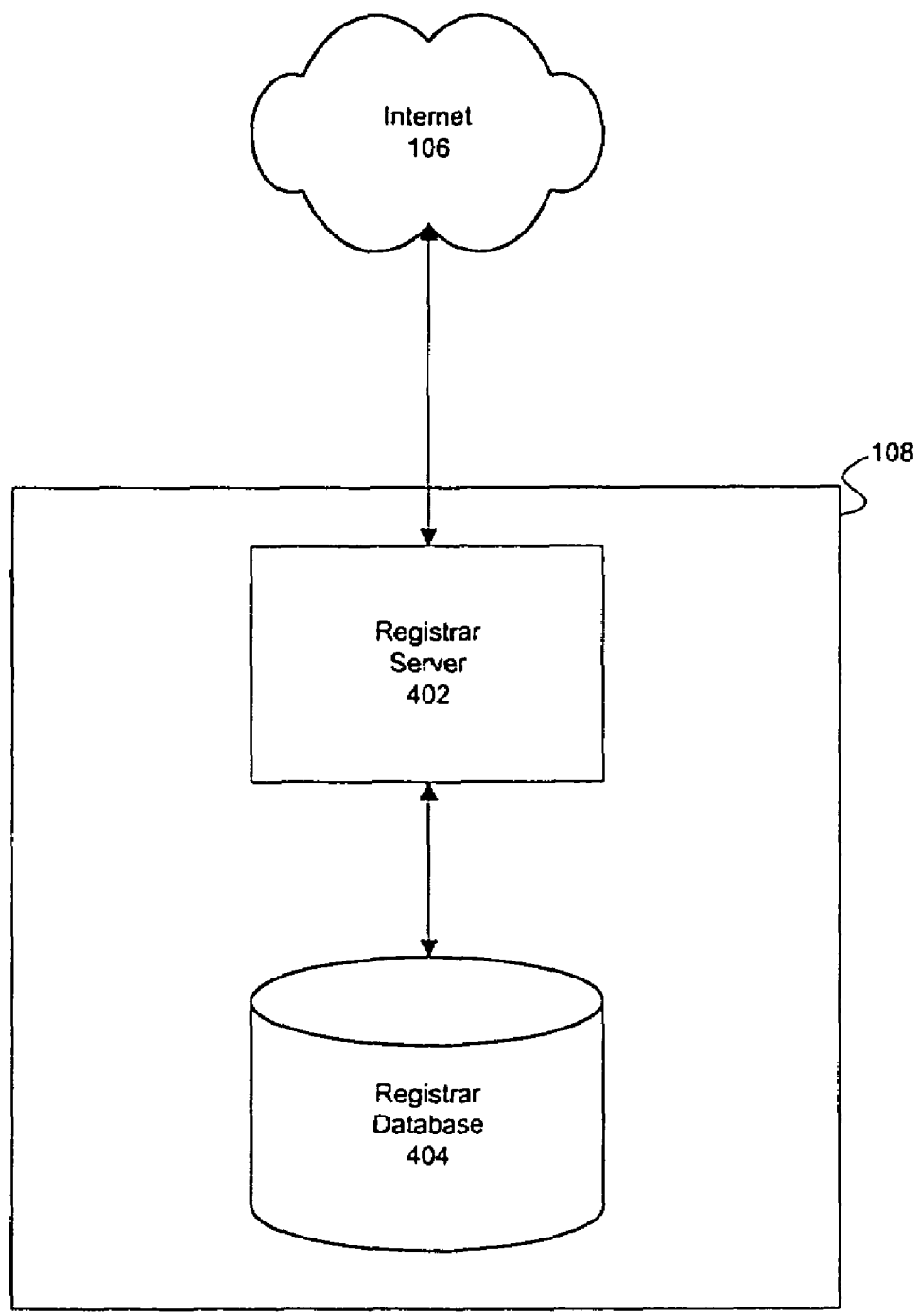
FIG. 4 is a diagram showing a partially expanded view of a registrar consistent with the present invention.

FIG. 4 is a diagram showing a partially expanded view of a registrar 108 consistent with the present invention. Registrar 108 includes registrar server 402 and registrar database 404. Registrars 110 and 112 may have an architecture that is similar or different than that described for registrar 108. A registrant (e.g., registrant 102) may access registrar server 402 over Internet 106. Registrar server 402 may host the registrar's web page and is utilized by registrant 102 to purchase or manage the various options that are associated with a domain name registration system account. For example, using the various web pages resident at registrar server 402, registrant 102 may sign up for an account, reserve or register a domain name, buy the web forwarding option, configure the web forwarding option (e.g., determine where a given web address will forward), buy electronic mail (e-mail) service, buy a single page business card, contact a customer service representation, etc.

In one embodiment, registrar 108 may be an e-mail template-based registrar system for registering a domain name. For example, after a customer has decided to register a domain name, registrar server 402 may present the customer with a series of screens asking for certain information from the customer. This information may include the registrants's e-mail address, registrant information, contact information, and name server information. After the registrant has entered the relevant information and submitted it, registrar server 402 e-mails a template containing the information to the registrant at the aforementioned e-mail address. The registrant must verify the information included in the template before e-mailing the template back to registrar server 402. Only after the template is e-mailed back to registrar server 402 will the request for registration be processed. Registrar server 402 sends the template to registrar database 404 for storage, after it has been determined that registration may proceed. In another embodiment, registrar 108 may be a web-based registrar system, where registrant-provided information may be processed by registrar 108 without first e-mailing a template back to the registrant.

Registrar database 404 functions as the main database for registrar 108 and stores information related to the registration of a domain name. For example, the information provided by the registrant may be stored in registrar database 404 after it has been determined that the desired domain name does not already exist in the database. Registrar database 404 periodically attempts to move its data to registry 114 so that new domain names may be officially registered. If a domain name that originates from registration database 204 is already stored in the registry then the domain name is not valid. This may happen if a customer from a different registrar had previously registered the domain name.

Data movement from the registrar database 404 to registry 114 occurs by utilizing RRP (registry registrar protocol). In order to utilize RRP, a registrar 108 needs to be capable of generating and sending requests in RRP. In one embodiment, registrar 108 may become capable of generating and sending RRP requests by receiving documentation, software, and/or technical support from registry 114 that is required to successfully implement RRP. Registry 114 may provide this information to registrar 108 after registrar 108 has successfully entered into an agreement with registry 114. Subsequently, employees at registrar 108 may setup RRP by creating a program capable of generating and sending RRP requests. Such a program may be resident at registrar server 402. Once an agreement has been made and registrar 108 has successfully setup RRP, registrar 108 may use RRP to perform various transactions with registry 114. For example, using the RRP, a registrar 108 may register a domain name or name server, check the availability of a domain name, delete the registration of a domain name or name server, get general information about RRP, update a registered domain name or name server, close an RRP connection, re-register a domain name, authenticate an RRP connection, query a domain name or name server, or transfer a domain name from another registrar to itself.

Figure 5:
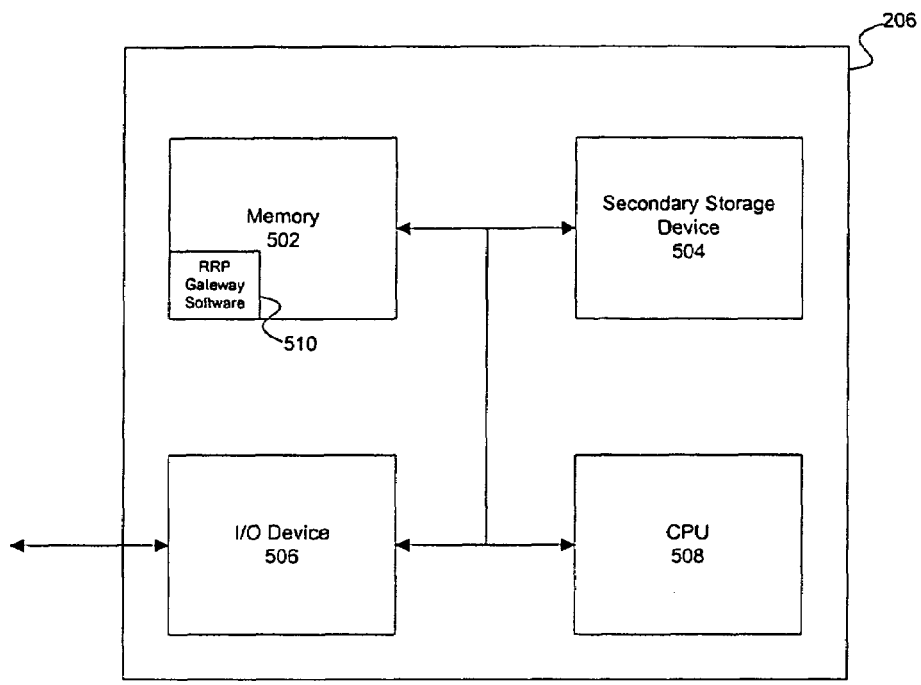
FIG. 5 is a diagram showing a partially expanded view of a RRP application gateway consistent with the present invention.

FIG. 5 is a diagram showing a partially expanded view of RRP application gateway 206 consistent with the present invention. RRP application gateways 208 and 210 may have an architecture that is similar to that described for RRP application gateway 206. RRP application gateway 206 includes memory 502, secondary storage device 504, I/O device 506, and CPU 508. RRP gateway software 510 is part of memory 502.

RRP gateway software 510 provides the main functionality for RRP application gateway 206. Accordingly, RRP gateway software 510 performs the authentication and decrypting/encrypting functions associated with RRP application gateway 206. RRP application gateway 206 receives RRP requests at I/O device 506 and passes them to CPU 508. CPU 508 executes RRP gateway software 510 to perform the aforementioned authentication and decrypting functions before sending the RRP request to an RRP application server 214. I/O device 506 receives responses to the RRP requests from RRP application server 214, so that the responses may be properly processed by the RRP gateway software and forwarded to the registrar. In one embodiment, RRP gateway software may be implemented in the Java® programming language.

Figure 6:
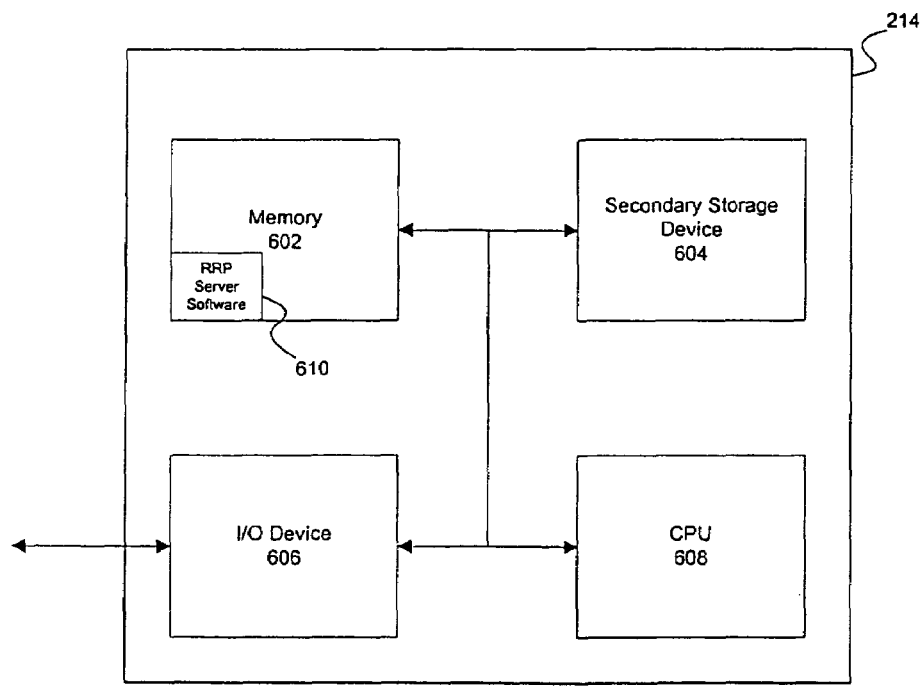
FIG. 6 is a diagram showing a partially expanded view of a RRP application server consistent with the present invention.

FIG. 6 is a diagram showing a partially expanded view of RRP application server 214 consistent with the present invention. RRP application servers 216 and 218 may have an architecture that is similar to that described for RRP application server 214. RRP application server 214 includes memory 602, secondary storage device 604, I/O device 606, and CPU 608. RRP server software 610 is part of memory 602.

RRP server software 610 provides the main functionality for RRP application server 214. Accordingly, RRP server software 610 executes an RRP command and causes the registry database to be changed. RRP application server 214 receives RRP requests at I/O device 606 and passes them to CPU 508. CPU 508 executes RRP server software 610 to perform the processing associated with executing an RRP command and cause any changes to the registry database to be made. RRP server software 610 may subsequently cause an appropriate response to be forwarded to RRP application gateway 206. In one embodiment, RRP server software 610 may be implemented in the Java® programming language.

Figure 7:
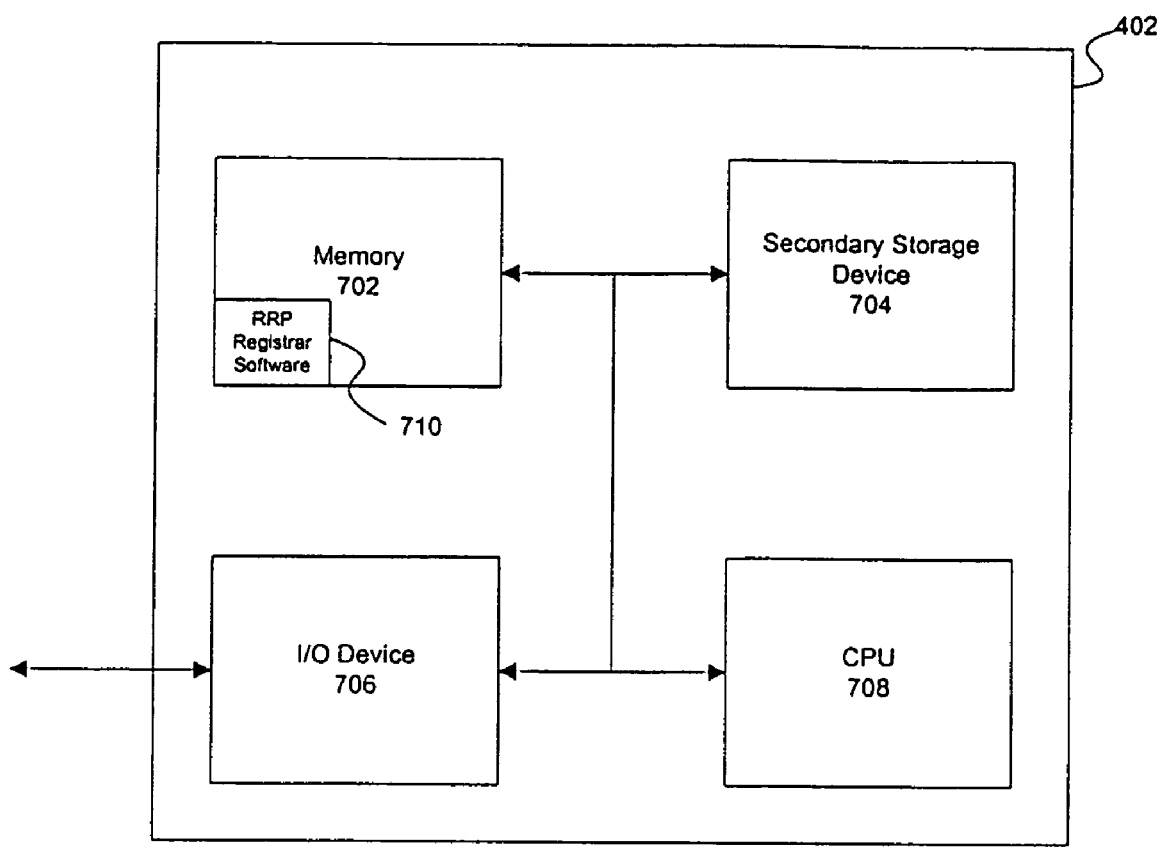
FIG. 7 is a diagram showing a partially expanded view of a registrar server consistent with the present invention.

FIG. 7 is a diagram showing a partially expanded view of registrar server 402 consistent with the present invention. Registrar server 402 includes memory 702, secondary storage device 704, I/O device 706, and CPU 708. RRP registrar software 710 is part of memory 702. RRP registrar software 710 generates RRP requests (e.g., commands) and causes them to be sent to a registry 114 in the proper format. In one embodiment, RRP registrar software 710 may be implemented in the Java® programming language.

Figure 8:
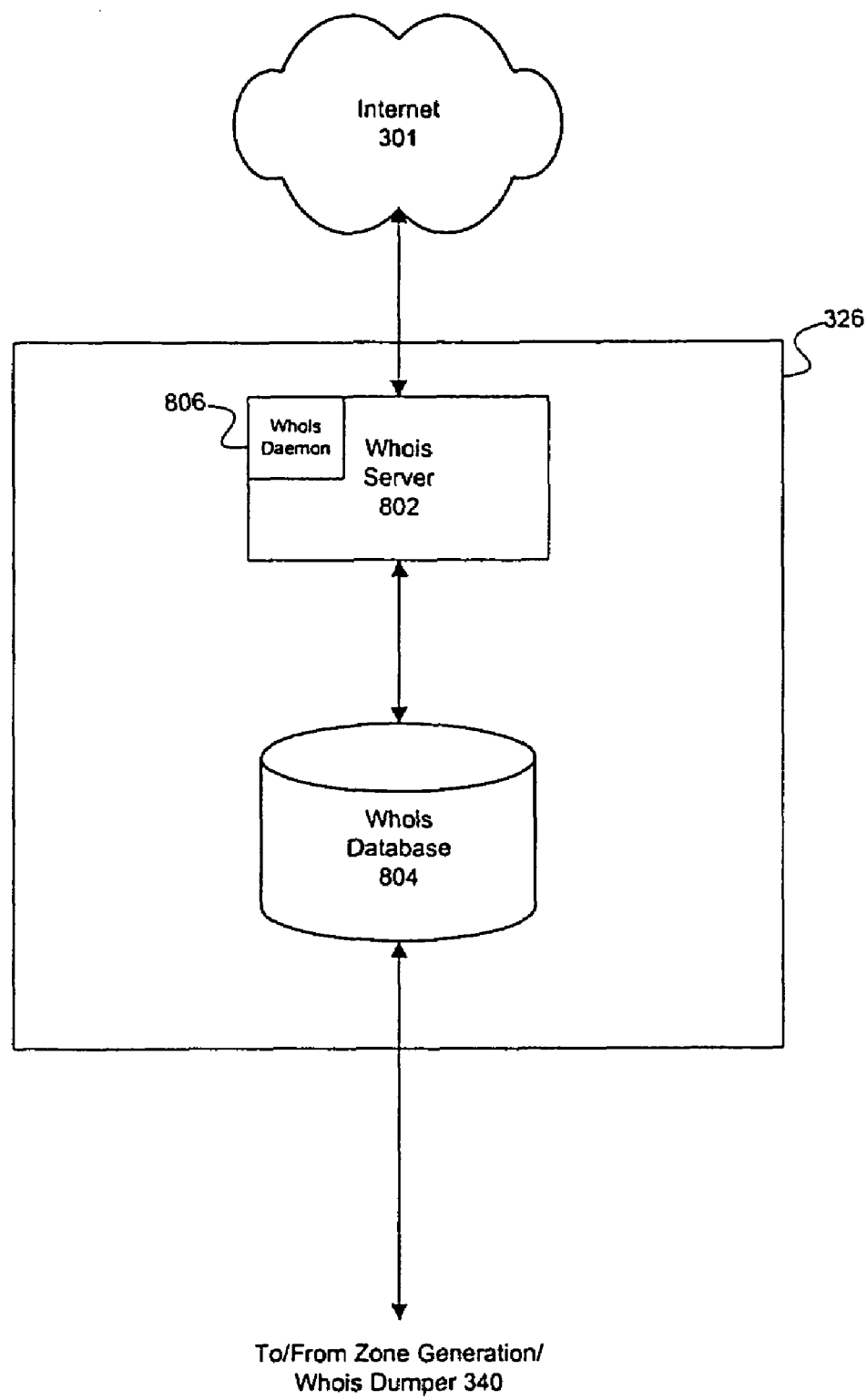
FIG. 8 is a diagram showing a partially expanded view of a whois system consistent with the present invention.

FIG. 8 is a diagram showing a partially expanded view of whois system 326 consistent with the present invention. Whois system 326 includes whois server 802 and whois database 804. Whois database 804 stores data received from zone generation/whois dumper 340 in several relational tables. In one embodiment, the tables may include a registrar table, a domain table, a domain name server link table, a name server table, and an IP name server link table.

Figure 9:
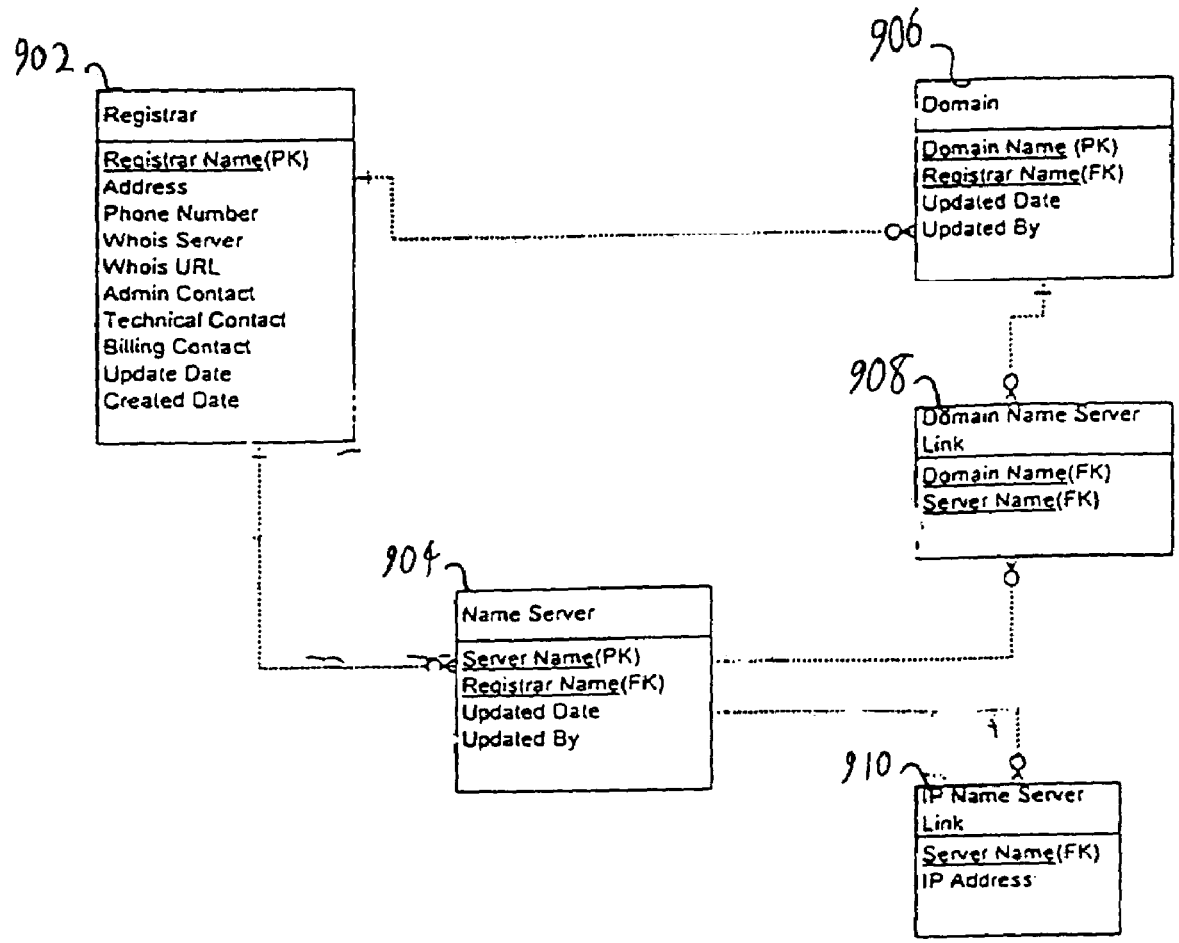
FIG. 9 is a diagram of the schema for a whois database consistent with the present invention.

FIG. 9 is a diagram of the schema for whois database 804 consistent with the present invention. Each of the tables may require certain information from registry database 322. For example, the registrar table 902 may require information from the following tables found in registry database 322: registrar, address, registrar whois reference, registrar contact link, and registrar contact. Registrar table 902 may include the following information: registrar name, address, phone number, whois server, whois URL, admin contact, technical contact, billing contact, updated date, created date. The domain table 906 may require information from the following tables found in registry database 322: domain and registrar. Domain table 906 may include the following information: domain name, updated date, and various data from registrar table 902. The name server table 904 may require information from the following tables found in registry database 322: name server and registrar. Name server table 904 may include the following information: server name, updated date, updated by, and various data from registrar table 902. The IP name server link table 910 may require information from the IP address table found in registry database 322. IP name server link table 910 may include the following information: IP address and various data from name server table 904. The domain name server link table 908 may receive its information from the other tables stored in whois database 804. Domain name server link may include the following information: various data from domain table 906 and various data from name server table 904.

Returning to FIG. 8, whois server 802 accepts queries from a whois client and retrieves the requested data from whois database 804. A whois client may be either a registrar or an individual Internet user. In one embodiment, a whois query may be performed on a fully qualified domain name, a fully qualified host name, an IP address of a name server, or a registrar's name. For example, if a whois client sends a domain name query to whois server 802, then whois server 802 retrieves information on the domain name from whois database 804 and returns it to the whois client. Corresponding information retrievals occur for the different types of queries.

A whois daemon program 806 resident on whois server 802 performs the processing of queries. For example, when whois daemon 806 receives a connection from a whois client, whois daemon 806 clones itself to a whoisd program and picks up a ready to use database connection from a database connection pool. Upon receiving a database connection, the whoisd approves or disapproves the connection. If the whoisd approves the connection, then it loads and performs the query, sends the results to the whois client, and returns the connection back to the connection pool. If the whoisd does not approve of the connection for some reason, the query is rejected.

FIG. 10 is a diagram of the schema for registry database 222 or 322 consistent with the present invention. Country table 1002 may contain all of the two and three character country codes and their associated names. Address table 1004 may contain all of the address information for registrars and their associated contacts. Registrar contact table 1006 may contain all of the contacts for all of the registrars. Registrar contact type table 1008 may identify the different types of contacts that can be associated with a registrar. Registrar whois reference table 1010 may contain whois reference information for registrars. There are two types of references. The registrar can have a URL that points to its whois service or a host name that is running the whois service. Registrar contact link table 1012 may contain an audit history for any modifications made to the registrar contact table 1006. Registrar table 1014 may contain information that is unique to each registrar.

Registry session table 1016 may contain the session information for all registrars and registry users. User type table 1018 may contain descriptions of the types of users in the registry to include registrars. Registry user table 1020 may contain internal registry user information. Registry user status description table 1022 may describe the statuses that a registry user can be in. Address audit table 1024 may contain an audit history for any modifications made to the address table 1004. Registrar contact audit 1026 may contain an audit history for any modifications made to the registrar contact table 1006. Registrar whois reference audit table 1028 may contain an audit history for any modifications made to the registrar whois reference table. Registrar contact link audit table 1030 may contain an audit history for any modifications made to the registrar contact link table 1012. Registrar audit table 1032 may contain an audit history for any modifications made to the registrar table 1014. Registrar daily operations summary table 1034 may contain a daily summary of all the operations a registrar has performed. Registrar YTD operation summary table 1036 may contain a year to date summary of the operations performed by registrars.

Product price table 1038 may contain a list of prices for products. Registrar status description table 1040 may describe the statuses that the registrar can be in. Invoice table 1042 may contain summary information of a registrar's chargeable activities for a specific period of time. Product table 1044 may contain a list of operations that have a cost associated with them. Domain audit table 1046 may contain an audit history for any modifications made to the domain table 1070. Domain name server link audit table 1048 may contain an audit history for any modifications made to the domain name server link table 1074. Name server audit table 1050 may contain an audit history for any modifications made to the name server table 1076. Name server IP address link audit table 1052 may contain an audit history for any modifications made to name server IP address link table 1078. IP address audit table 1054 may contain an audit history for any modifications made to the IP address table 1080.

Transaction table 1056 may link all of the audit history tables to an operation, session, and the registrar that was affected by the transaction. Invoice line item table 1058 may contain information of a registrar's chargeable activities that occurred during a specific period of time. Invoice status description table 1060 may be used as a lookup table to describe what the status of an invoice is. Operation table 1062 may contain operations that can be performed within the registry. Privilege table 1064 may be used to determine whether a specific user with a specific status entering through a specific channel can perform an operation. Channel table 1066 may be used as a lookup table to identify the channel a particular user enters into the registry system from. Authoritative TLD table 1068 may list all of the TLDs the registry is authoritative for. Domain table 1070 may contain all of the domain names that belong to the TLDs the registry is authoritative for. Domain status description table 1072 may contain the description of all allowable domain statuses. It may also determine whether the domains in a particular status are inserted into the DNS zone files. Domain name server link table 1074 may be the link between a domain and the name servers that provide name service for the domain.

Name server table 1076 may be used to hold all of the name servers that provide name service for the domains in the domain table 1070. Name server IP address link table 1078 may link name servers to IP addresses. IP address table 1080 may be used to hold the IP addresses for name servers. Domain status user type link table 1082 may determine whether a specific user type can modify the domains in a given status. In addition it may determine what user types can set domains to what statuses. Business target table 1084 may contain all of the business targets for the registry. A business target is an action that can be performed by a registry user. Target rule link table 1086 may link business rules to the business targets that describe them. This table also sets the sequence in which a rule will be performed on a target. Business rule table 1088 may contain all of the business rules for the registry. Business rules are used to define a business target. Multiple rules can be assigned to a target and a rule can be assigned to multiple targets. A rule can be a database, Boolean, or modifier rule. Period table 1090 may contain the default period associated with a specific parameter. Invalid IP range 1092 may be used as a lookup table to identify whether a specific IP address is within the range of invalid IP addresses. Configuration table 1094 may be used by a configuration package to store configuration parameters for the registry system.

Other tables not explicitly shown in the database schema of FIG. 10 may also be included in registry database 222 or 322. For example, registry database 222 or 322 may include an e-mail template table, an e-mail queue table, an e-mail queue audit table, a domain status reason table, a domain status reason description table, a domain status reason audit table, a domain status reason link table, a domain pending transfer table, a domain pending transfer audit table, and a transaction attribute table. An e-mail template table may store various formats for different types of e-mails. An e-mail queue table may store e-mail messages to be sent to registrars. An e-mail queue audit table may store an audit history for any modifications made to the e-mail queue table. A domain status reason table may contain indications of reasons for placing domains in a particular status. A domain status reason description table may contain descriptions of the reasons indicated in the domain status reason table. A domain status reason audit table may contain an audit history for any modifications made to the domain status reason table. A domain status reason link table may link reasons to statuses. A domain pending transfer table may contain information indicative of domains that are pending transfer from one registrar to another (e.g., domain ID, request transaction ID, request registrar ID, request date, response date, notify sent, acknowledgment). A domain pending transfer audit table may contain an audit history for any modifications made to the domain pending transfer table. A transaction attribute table may contain attributes that pertain to transactions described in the transaction table.

A more complete description of each of the tables in registry database 222 or 322 is included in Appendix A.

Shared Registration System Operation

Figure 11:
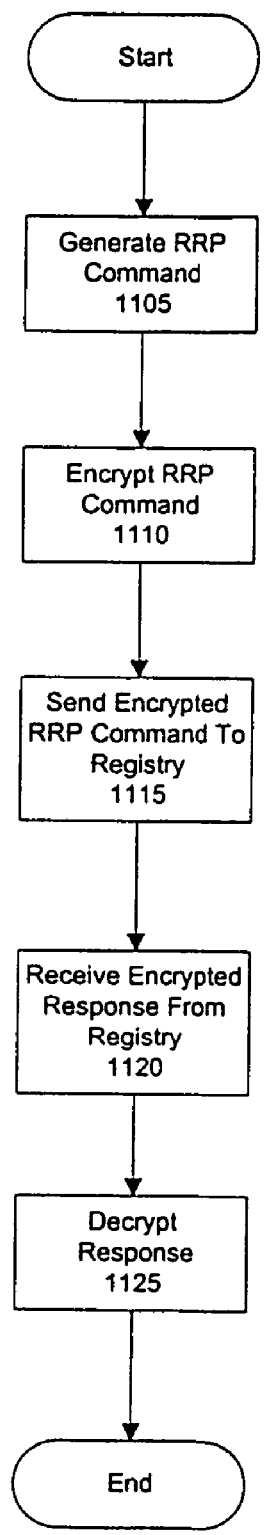
FIG. 11 shows an exemplary flowchart of a process for generating and transmitting RRP commands in a manner consistent with the present invention.

FIG. 11 shows an exemplary flowchart of a process for generating and transmitting RRP commands (e.g., requests) in a manner consistent with the present invention. This process may be implemented, for example using RRP registrar software 710 resident on a registrar 108, 110, or 112. For the purposes of discussing FIG. 11, it is assumed that processing occurs at registrar 108.

Initially, RRP registrar software 710 generates a suitable RRP command (step 1105). In the case that an RRP connection has not yet been established with registry 114, this command should be a command that establishes an RRP connection, such as a SESSION command. The specific RRP commands are more fully discussed in the section entitled "Registry Registrar Protocol." In the case that an RRP connection has already been established with registry 114, the generated command may be any RRP command. After an RRP command has been generated, RRP registrar software 710 causes the command to be encrypted using, for example, SSL protocol (step 1110). Registrar 108 then sends the encrypted RRP command to registry 114 via Internet 106, where the command may be processed (step 1115).

When registry 114 has received the RRP command and taken appropriate actions with respect to that command, it generates an encrypted response for registrar 108 that may include a response code indicating the results of the RRP command. Registrar 108 performs other tasks until it receives the encrypted response from registry 114 (step 1120). Next, RRP registrar software 710 causes the encrypted response to be decrypted (step 1125). Registrar 108 may perform any actions that may be necessary after receiving the response. For example, registrar 108 may re-send the RRP command if execution failed, send a different RRP command, disconnect a registrant after a predetermined number of failures, etc.

Figure 12:
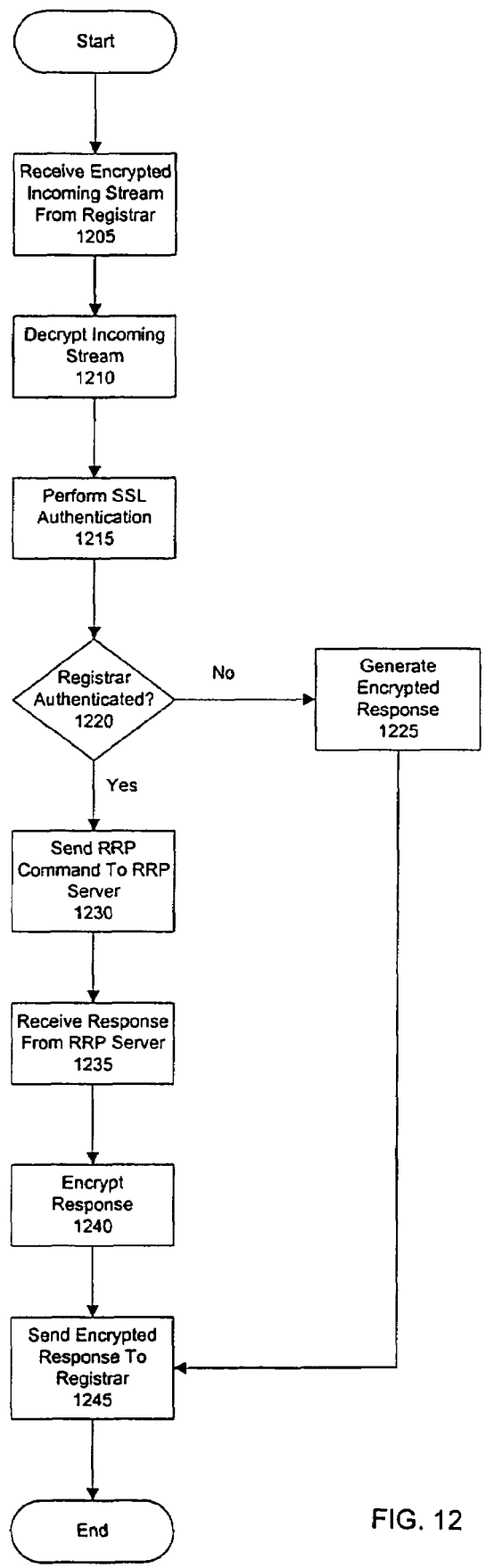
FIG. 12 shows an exemplary flowchart of a process for providing transport layer security for a shared registration system in a manner consistent with the present invention.

FIG. 12 shows an exemplary flowchart of a process for providing transport layer security for the shared registration system in a manner consistent with the present invention. This process may be implemented, for example using RRP gateway software 510 resident on RRP application gateway 206, 208, or 210. For the purposes of discussing FIG. 12, it is assumed that processing occurs at RRP application gateway 206.

RRP application gateway 206 receives an encrypted data stream from a registrar attempting to perform an RRP command (step 1205). The incoming encrypted data stream includes the RRP command that is to be executed. Upon receipt of the encrypted data, RRP application gateway 206 decrypts the data stream according to, for example, the SSL protocol (step 1210).

RRP application gateway 206 then attempts to authenticate the registrar that sent the encrypted data by performing SSL authentication (step 1215). In one embodiment, the authentication may be a mutual authentication process also referred to as "SSL handshake." For example, the registrar may be authenticated by RRP application gateway 206 based on a X.509 certificate that it presents to RRP application gateway 206 at the time of connection. RRP application gateway 206 provides the registrar with an opportunity to authenticate RRP application gateway 206 based on a certificate that RRP application gateway 206 provides to the registrar. Assuming that the mutual authentication succeeds, RRP application gateway 206 may exchange a session key with the registrar. The session key may be used to encrypt further communication between RRP application gateway 206 and the registrar.

After RRP application gateway 206 attempts to authenticate the registrar, it determines whether or not the authentication process resulted in the registrar being declared authenticated (step 1220). If RRP application gateway 206 determines that the registrar is not authenticated, then RRP application gateway 206 generates an encrypted response that is to be sent back to the registrar (step 1225). This response informs the registrar that authentication has failed.

If RRP application gateway 206 determines that the registrar is authenticated, then RRP application gateway 206 opens a dedicated connection with RRP application server 214 for the registrar. In one embodiment, connections to RRP application servers may be made according to a technique known as connection pooling. For example, because each RRP application gateway is capable of having many connection threads simultaneously, it is possible that the RRP application servers may become overwhelmed by the number of connection threads that are being maintained, causing bottlenecking. To remedy this problem, the RRP application servers process less than all of the connection threads at once. The connection threads that are not presently being processed are placed into a queue resident on the RRP application servers and are handled in turn. In that manner, the number of connections can be kept to a reasonable number. Furthermore, due to the speed with which the connections are processed, the queues are not allowed to fill up, thus improving processing times over a system that does not utilize connection pooling. Note that connection pooling may also be utilized for the connections made between the registrars and the RRP application gateways.

After a connection has been established, RRP application gateway 206 may then send an RRP command from the data stream received from the registrar to RRP application server 214 (step 1230). When RRP application server 214 has received the RRP command and taken appropriate actions with respect to that command, it generates a response that may include a response code indicating the results of the RRP command. RRP application gateway 206 performs other tasks until it receives the response from RRP application server 214 (step 1235). Subsequently, the response is encrypted (step 1240) and sent to the registrar that initiated communication (step 1245).

Figure 13:
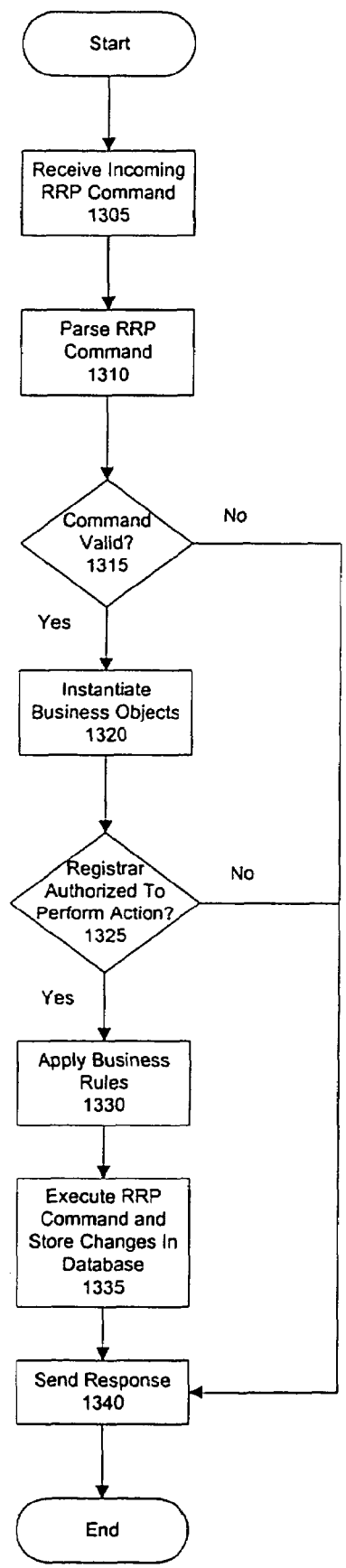
FIG. 13 shows an exemplary flowchart of a process for receiving and executing an RRP command in a manner consistent with the present invention.

FIG. 13 shows an exemplary flowchart of a process for receiving and executing an RRP command in a manner consistent with the present invention. This process may be implemented, for example using RRP server software 610 resident on RRP application server 214, 216, or 218. For the purposes of discussing FIG. 13, it is assumed that processing occurs at RRP application server 214.

After a connection has been established, RRP application server 214 waits until it receives an RRP command from RRP application gateway 206 (step 1305). Subsequently, RRP application server 214 parses the RRP command so that analysis of the command may be performed (step 1310). As part of this analysis, RRP application server 214 makes a determination as to whether or not the command is valid (step 1315). For example, a command may not be valid if the syntax of certain data fields is incorrect, the length of certain data fields is incorrect, the domain or name server is the wrong type etc. If RRP application server 214 determines that the command is not valid, then a response is sent to the registrar via RRP application gateway 206 detailing the deficiency in the command (step 1340).

If RRP application server 214 determines that the command is valid, then a number of business objects that may be required to execute the RRP command are instantiated (step 1320). These objects may be instantiated in memory, such as memory 602. There are several types of business objects that may be instantiated. For example, for a given operation, RRP application server 214 may need to instantiate domain objects, name server objects, registrar objects, business riles objects, etc. In one embodiment, the types of objects that are instantiated differ according to the RRP command that is being executed and the attributes included in the RRP command. For example, it may not be necessary to instantiate a name server object when RRP application server 214 attempts to execute an RRP command that adds a domain name. Data received from the RRP command may be included in certain objects. For example, an RRP command that adds a domain name may include attributes indicating the domain name to be added to the registry database and the name server(s) of the domain name. These attributes may be inserted into an instantiated domain object along with attributes that may need to be generated each time a domain name is added (e.g., created date, updated date, registrar, etc.). Business rules objects correspond to business policy-related information that may be applied to the RRP command to ensure that operations go according to present business policy.

It may be necessary for RRP application server 214 to retrieve information from registry database 222 in order to perform certain RRP commands. For example, RRP application server 214 may retrieve information that corresponds to a domain name in the case that a registrar sends a RRP command for updating an existing domain. This information may then be inserted into an appropriate object for processing.

RRP application server 214 next makes a determination whether or not the registrar that sent the RRP command is authorized to perform the action that results from the RRP command (step 1325). For example, a registrar may not be authorized to perform a particular action if the registrar does not own the domain referred to in the RRP command. If the registrar is determined not to be authorized, then a response may be sent back to the registrar providing an indication to that effect (step 1340).

If the registrar is determined to be authorized, then RRP application server 214 applies business rules to the RRP command (step 1330). Application of the business rules may be accomplished by using the business rule objects that were previously instantiated. Business rules may exist to check and set a variety of attributes to ensure that all RRP commands are executed according to registry policy. For example, there may be a rule for checking the credit of the registrar, a rule for setting the registration period, a rule for checking the domain status, a rule for checking the existence of a parent domain, a rule for checking the authorization of the registrar, etc. These rules may change according to the policy of the business that owns registry 114. Note that one of the aforementioned rules checks the authorization of the registrar, indicating that the previous check to determine whether a registrar is authorized to perform an action (step 1325) may alternatively be implemented as an application of a business rule. In one embodiment, each RRP command may have a different set of business rules that are applied when the RRP command is executed (e.g., a RRP command adding a domain name has a different set of rules than an RRP command transferring a domain name).

Once the business rules have been applied, RRP application server 214 proceeds to execute the RRP command and store any changes necessitated by the RRP command in registry database 222 (step 1335). Changes include any insertions, updates, or deletions to the tables stored in registry database 222. In one embodiment, RRP application server 214 may attempt to implement these changes by sending the relevant business objects or information from these objects to registry database 222 through database server 220 along with an indication as to how the database should be changed or accessed. The information from the objects may be inserted into various tables in registry database 222, or the objects themselves may be inserted into the registry database 222. Implicit in the changes made to registry database 222 may be certain checks that are necessary to complete some operations. For example, when a RRP command for adding a domain name is executed, there is an implicit check to determine whether or not the domain name has already been registered by another registrar.

Database server 220 includes functionality that handles any possible schema contentions. A schema contention may occur, for example, when multiple connection threads attempt to access the same table at substantially the same time. One manner in which these contentions are handled is by giving certain transactions priority over others. For example, real-time transactions could be given priority over non-real time transactions. Another technique is to designate tables as locked or held when they are currently being accessed or have a transaction pending.

Database server 220 may send RRP application server 214 an indication of the result of the attempted changes to registry database 222. Upon learning this result, RRP application server 214 sends a response indicative of the result to the registrar that initiated communication via RRP application gateway 206 (step 1340). Examples of responses include an indication that the command was completed successfully and an indication that the domain that was attempted to be accessed does not exist. In the case that the RRP command was primarily intended to retrieve or check information from the registry database (e.g., STATUS command, CHECK command), the response may include the requested information. A more complete sampling of possible responses to a registrar is included below in the section entitled "Registry Registrar Protocol."

Figure 14:
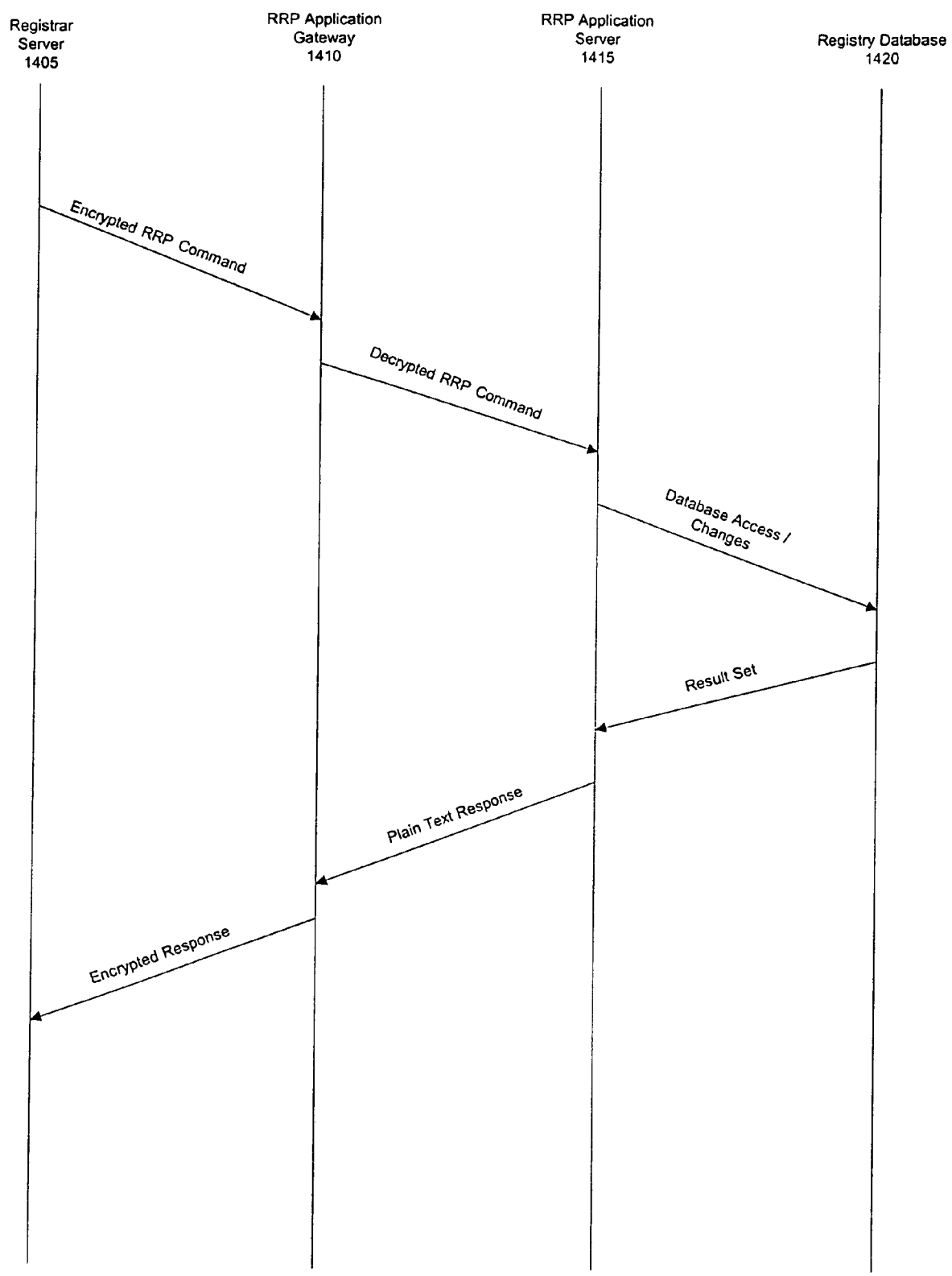
FIG. 14 shows a diagram of a simple interaction between a registrar and a registry consistent with the present invention.

FIG. 14 shows a diagram of a simple interaction between a registrar and a registry consistent with the present invention. Registrar server 1405 initiates the operation by sending RRP application gateway 1410 an encrypted RRP command. After decrypting the command, performing SSL authentication, and ensuring that the registrar that controls registrar server 1405 is authenticated, RRP application gateway 1410 sends a decrypted RRP command to RRP application server 1415. RRP application server 1415 parses the command, checks the validity of the command, instantiates any business objects that are needed for the command, ensures that the registrar is authorized to perform the required actions, and applies any relevant business rules to the command. Subsequently, RRP application server 1415 accesses the registry database 1420 in order to make any necessary changes in light of the RRP command. When the changes are made at registry database 1420, the database and its database server send a result set to RRP application server 1415 indicating the result of the attempted changes. RRP application server 1415 uses the result set information to generate a response to the registrar and sends a plain text response to RRP application gateway 1410. Thereafter, RRP application gateway 1410 encrypts the response and sends it to registrar server 1405.

Registry Registrar Protocol

1. Data Model

Figure 15:
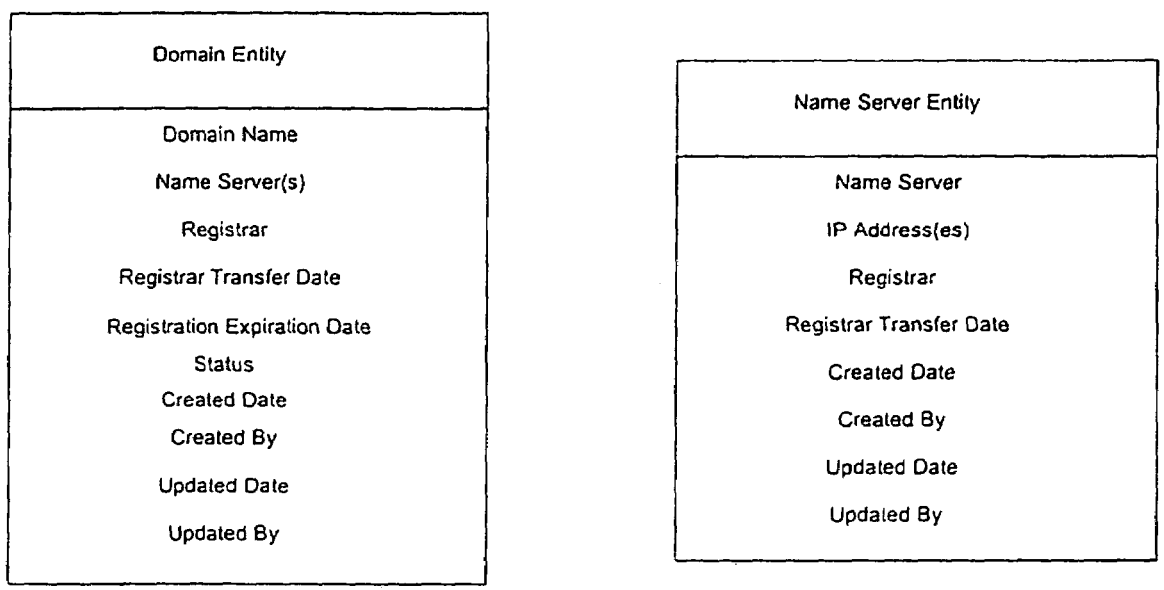
FIG. 15 shows an example of the domain and name server entities consistent with the present invention.

The registry registrar protocol (RRP) defines two entities to represent the system data, domain and name server. In one embodiment, the domain and name server entities may correspond to domain objects and name server objects. FIG. 15 shows an example of the domain and name server entities consistent with the present invention.

1.1 Domain Entity

The domain entity holds information about a registered domain name including the attributes described below.

| | |
|---|---|
| Domain Name | The fully qualified domain name of the registered domain name. It is the unique key for this entity. |
| Name Server | The fully qualified host name of the domain's name server. |
| Registrar | The name of the current registrar of the domain name. It is an implicit attribute. |
| Registrar Transfer Date | The date the domain name was transferred to the current registrar. It is an implicit attribute. |
| Registration Period | The time period that registration lasts. |
| RegistrationExpirationDate | The date on which the registration of the domain name expires and the domain name becomes available for registration by any registrar after a specified hold period. This is a derived attribute. |
| Status | The status of the domain name. |
| Created Date | The date the domain name was registered. It is an implicit attribute. |
| Created By | The ID of the authorized entity that registered the domain name. It is an implicit attribute. |
| Updated Date | The date the domain name was last updated. It is an implicit attribute. |
| Updated By | The ID of the authorized entity that last updated the domain name. It is an implicit attribute. |

1.2 Name Server Entity

The name server entity holds information about a name server including the attributes described below.

| | |
|---|---|
| Name Server | The fully qualified host name of the domain's name server. It is the unique key for this entity. |
| IP Address | An IP address for the name server. |
| Registrar | The name of the current registrar of the name server. It is an implicit attribute. |

-continued

| | |
|---|---|
| Registrar Transfer Date | The date the name server was transferred to the current registrar. It is an implicit attribute. |
| Created Date | The date the name server was registered. It is an implicit attribute. |
| Created By | The ID of the authorized entity that registered the name server. It is an implicit attribute. |
| Updated Date | The date the name server was last updated. It is an implicit attribute. |
| Updated By | The ID of the authorized entity that last updated the name server. It is an implicit attribute. |

2. Protocol

Generally, all RRP commands may include features to ensure that the effect of each command is the same if the command is executed once or if the command is executed multiple times. This property is extremely useful in situations when a command is retried due to an error condition that results in a missed command response and a command retry is attempted. Command retries will be caught by the system and rejected with an appropriate error response code.

Figure 16:
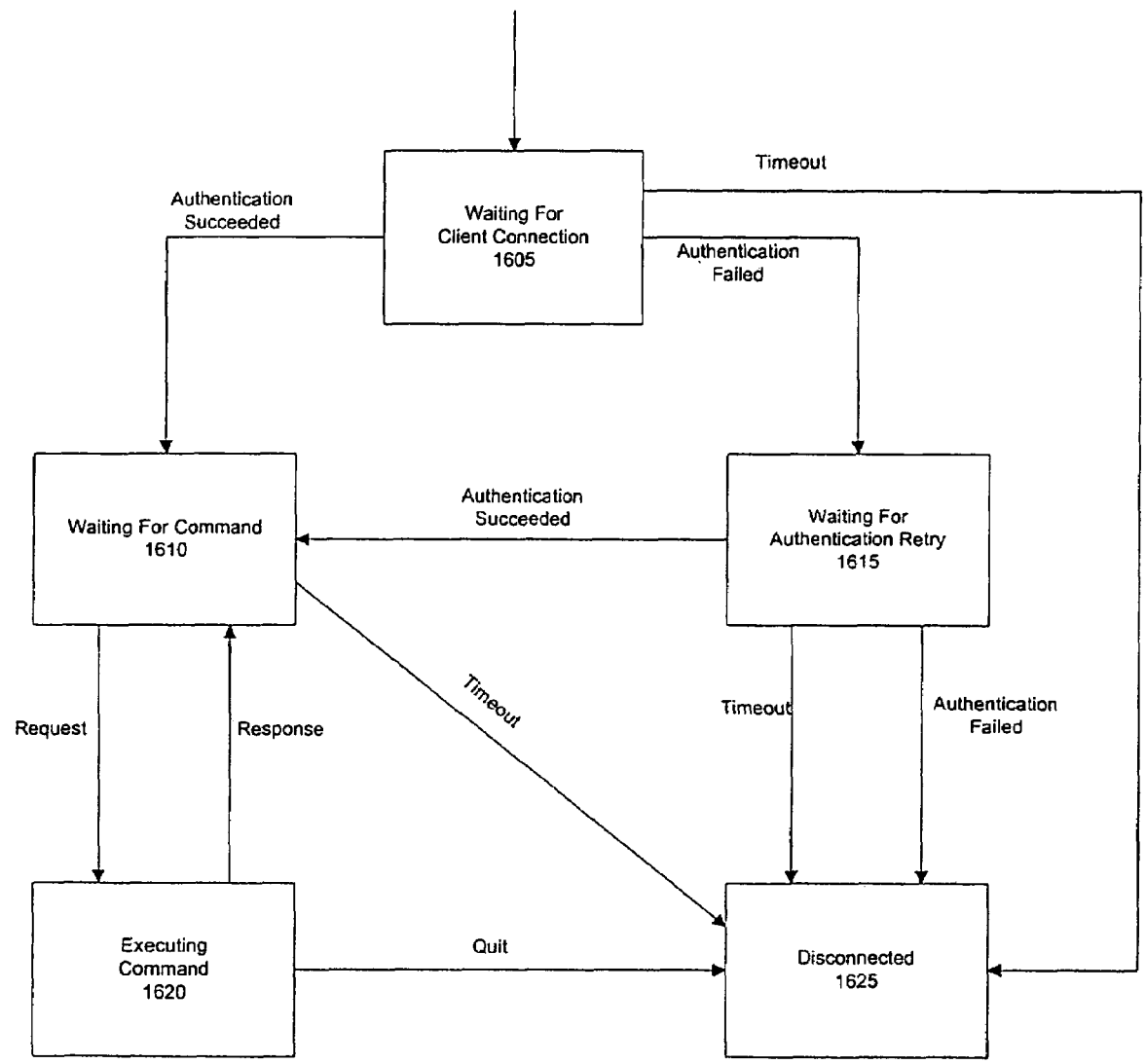
FIG. 16 is a diagram showing the possible states of an RRP session consistent with the present invention.

A typical RRP session will go through a number of states. FIG. 16 is a diagram showing the possible states of an RRP session consistent with the present invention. Initially, the system (e.g., registry) waits for a client connection (1605). When a client connects, the system attempts to authenticate the client (e.g., registrar). If the authentication fails, the system gives the client another chance to identify itself (1615). If the authentication fails again, the system disconnects (1625). Otherwise, the system waits for a request (e.g., RRP command) from the client (1610). Upon receiving a request, the system executes it and responds to the client with the result (1620). The system then waits again for another request from the client (1610). If the client sends a "quit" command, the system ends the session and disconnects (1625). To keep its state in sync with that of the server, the client should wait for a response from the server before sending another request on the same connections. Note that states 1605, 1610, and 1615 may timeout after a pre-defined period of inactivity. The system disconnects in response to a timeout.

2.1 Request Format

An RRP request includes a command name, some command options, an entity block, and an end-of-command delimiter. Command options and entity blocks collectively define command parameters and are order independent. The command options and the entity block are optional. Below is an example of the format of an RRP request.

| Command Name | [Command Options] | [Entity Block] | End-Of-Command Delimiter |
|---|---|---|---|

2.1.1 Command Name

A command name specifies the type of an RRP request. A command name may be a word or abbreviation terminated by a carriage-return linefeed (crlf) sequence. Below is an example of the format of a command name.

| Command Name | crlf |
|---|---|

2.1.2 Command Option

A command option specifies a control parameter for an RRP request. A command option starts with a hyphen, followed by the option name, a colon, the option value, and terminated by a crlf sequence. Below is an example of the format of a command option.

| - | command option name | : | command option value | crlf |
|---|---|---|---|---|

2.1.3 Entity Block

An entity block specifies the data in an RRP request. It includes attribute-value pairs specifying the entity (e.g., domain or name server) and all of the attributes of the entity. Each attribute-value pair starts with the attribute name, followed by a colon, the attribute value, and finally terminated by a crlf sequence. Below is an example of the format of an entity block.

| entity name | : | entity value | crlf | attribute name | : | attribute value | crlf ... |
|---|---|---|---|---|---|---|---|

2.1.4 End-Of-Command Delimiter

An end-of-command delimiter specifies the end of an RRP request. It is a period followed by a crlf sequence.

2.2 Response Format

An RRP response starts with a response code, followed by a space, an ASCII text description of the response, a crlf sequence, and zero or more attribute-value pair lines. An RRP response is terminated by a dot in column one followed by a crlf sequence. Below is an example of the response format.

| response code | space | response description | crlf | attribute name | : | attribute value | crlf ... | crlf |
|---|---|---|---|---|---|---|---|---|

2.3 Commands

The commands provided by the RRP follow.

2.3.1 Add

This command enables a registrar to register a domain name or a name server on behalf of a registrant.

A request to register a domain name must contain the following data: the entity name attribute set to the value "domain," a fully qualified domain name in the domain name attribute, and fully qualified host names of two or more (up to 13) name servers hosting the domain name in multiple instances of the name server attribute. If the domain name is successfully registered, the registry may successfully return the domain's registration expiration date in the registration expiration data attribute in the response.

A request to register a name server must contain the following data: the entity name attribute set to the value "name server," a fully qualified host name of the name server in the name server attribute, and one or more IP address of the name server in multiple instances of the IP address attribute.

In one embodiment, an ADD command for registering a domain name may affect, for example, the following registry database tables: the domain table, the domain status table, the domain status reason table, the transaction table, the transaction attribute table, the registrar table, the domain name server link table, and the various audit tables that are associated with the aforementioned tables. An ADD command for registering a name server may affect, for example, the following registry database table: the name server table, the IP address table, the name server IP address link table, the transaction table, the transaction attribute table, and the various audit tables that are associated with the aforementioned tables.

Authorized User: all registrars may use the ADD command to register a domain name or name server.

2.3.2 Check

This command enables a registrar to determine if a domain name or name server has been registered.

A request to check the availability of a domain name must contain the following data: the entity name attribute set to the value "domain," and a fully qualified domain name in the domain name attribute. The registry responds positively or negatively about the availability of the name server.

A request to determine if a name server has been registered must contain the following data: the entity name attribute set to the value "name server" and a fully qualified host name of the name server in the name server attribute. The registry responds positively or negatively about the availability of the name server. If the name server has been registered the registry returns the IP address(es) of the name server.

In one embodiment, a CHECK command may access the domain table or the name server table in the registry database dependent on whether the registrar desires to determine the availability of a domain name or name server.

Authorized User: all registrars may use the CHECK command to determine if a domain name or name server has been registered.

2.3.3 Del

This command enables a registrar to delete the registration of a domain name or delete a name server.

A request to delete the registration of a domain name must contain the following data: the entity name attribute set to the value "domain," and a fully qualified domain name in the domain name attribute. A request to delete a domain name may cause the deletion of all name servers that are children of the domain being deleted.

A request to delete a name server must contain the following data: the entity name attribute set to the value "name server" and a fully qualified host name of the name server in the name server attribute. Deletions of name servers are not allowed if domain names are currently host on it because such deletions will result in orphaning the host domains.

In one embodiment, a DEL command for deleting a domain name may affect, for example, the following registry database tables: the domain table, the domain status table, the domain status reason table, the transaction table, the transaction attribute table, the registrar table, the domain name server link table, and the various audit tables that are associated with the aforementioned tables. A DEL command for deleting a name server may affect, for example, the following registry database table: the name server table, the IP address table, the name server IP address link table, the transaction table, the transaction attribute table, and the various audit tables that are associated with the aforementioned tables.

Authorized User: the current registrar of a domain name or name server and the registry use the DEL command to delete a domain name or name server.

2.3.4 Describe

This command enables a registrar to get general information about RRP.

A request to get general information about RRP may contain the following command options: the target option set to value "protocol" to get the protocol version number. The registry, by default, must return the protocol version number, regardless of whether the request contains the target option. In one embodiment, this command does not affect any of the registry database tables.

Authorized User: all registrars may use the DESCRIBE command.

2.3.5 Mod

This command enables a registrar to update a registered domain name or name server. The command allows the following operations on an attribute value for both single-valued and multiple-valued attributes:

Add an attribute value. The value to be added must be unique among the values of the attribute. For a single-valued attribute, it replaces the current value.

Remove an attribute value. The value to be removed must exist. Further, an attribute value cannot be removed if it is the only value of a required attribute.

Replace an attribute value. The value to be replace must exist and the replacing value must be unique among the values of the attribute.

A request to update a registered domain name must contain the following data: the entity name attribute set to the value "domain," and a fully qualified domain name in the domain name attribute. The registrar may perform the following update operations on the domain name: update the name servers of the domain name by setting one or more instances of the name server attribute, and update the status of the domain name by setting one or more instance of the status attribute.

A request to update a name server must contain the following data: the entity name attribute set to the value "name server" and a fully qualified host name of the name server in the name server attribute. The registrar may perform the following update operations on the name server:

update the name server attribute of the name server, and update the IP address of the name server by setting one or more instances of the IP address parameter.

In one embodiment, a MOD command for updating a domain name may affect, for example, the following registry database tables: the domain table, the domain status table, the domain status reason table, the transaction table, the transaction attribute table, the domain name server link table, and the various audit tables that are associated with the aforementioned tables. A MOD command for updating a name server may affect, for example, the following registry database table: the name server table, the IP address table, the name server IP address link table, the transaction table, the transaction attribute table, and the various audit tables that are associated with the aforementioned tables.

Authorized User: the current registrar of a domain name or name server and the registry may use the MOD command to modify the attributes of the domain name or name server.

2.3.6 Quit

This command enables a registrar to close an RRP connection. The registry must respond before closing the connection.

In one embodiment, a QUIT command may affect the registry session table in the registry database.

Authorized User: all registrars are allowed to use the QUIT command.

2.3.7 Renew

This command enables a registrar to re-register a domain name.

A request to re-register a domain name must contain the following data: the entity name attribute set to the value "domain," and a fully qualified domain name in the domain name attribute.

The request to renew a domain name may contain a renewal period for the domain being renewed in a single instance of a period attribute and a single instance of a current expiration year attribute. These parameters must appear together if either is specified. The period attribute identifies the number of years to be added to the registration. The current expiration year attribute identifies the current expiration year and is required to ensure that repeated attempts to retry this command do not result in multiple successful renewals. If these attributes are not provided, the registry provides a default value for the period attribute and current expiration year attribute. If the domain name renewal is successfully completed, the registry returns the new registration expiration data in the appropriate attribute.

In one embodiment, a RENEW command may affect, for example, the following registry database tables: the domain table, the transaction table, the transaction attribute table, the registrar table, and the various audit tables that are associated with the aforementioned tables.

Authorized User: the current registrar of a domain name may use the RENEW command.

2.3.8 Session

This command enables a registrar to authenticate a RRP connection. A registrar can also use this command to change its password. The registrar must send this request before any other request to the registry.

A request to authenticate an RRP connection must contain the following command options: the ID of the registrar in the ID option, and the password of the registrar in the password option. If the authentication fails, the registrar may re-send the request with corrected information. If the authentication fails a predetermined number of time, the registry closes the connection.

In one embodiment, a SESSION command may affect the registry session table in the registry database.

Authorized User: all registrars are allowed to use the SESSION command.

2.3.9 Status

This command allows a registrar to determine the current status of a domain name or name server.

A request to query a domain name must contain the following data: the entity name attribute set to the value "domain," and a fully qualified domain name in the domain name attribute. The response from the registry may contain a variety of information, including the following: fully qualified server names of name servers hosting the domain name, registration expiration date, ID of the current registrar of the domain name, date the domain name was transferred by the current registrar, current statuses of the domain name, date the domain name was originally registered, ID of the registrar that originally registered the domain name, date the domain name was last updated, and ID of the entity (e.g., registrar or registry) that last updated the domain name.

A request to query a name server must contain the following data: the entity name attribute set to the value "name server" and a fully qualified host name of the name server in the name server attribute. The response from the registry may contain a variety of information, including the following: fully qualified name of the name server, IP addresses of the name server, ID of the current registrar of the name server, date the name server was transferred by the current registrar, date the name server registered, ID of the entity that registered the name server, date the name server was last updated, and ID of the entity (e.g., registrar or registry) that last updated the name server.

In one embodiment, a STATUS command may access the domain table or the name server table in the registry database dependent on whether the registrar desires to determine the current status of a domain name or a name server.

Authorized User: the current registrar of a domain name or name server and the registry may use the STATUS command to view current domain name or name server attributes.

2.3.10 Transfer

This command allows a registrar to request transfer of domain name sponsorship from a second registrar and to approve or reject transfer requests initiated by other registrars.

A request to transfer a domain name must include the following data: the entity name attribute set to the value "domain," and a fully qualified domain name in the domain name attribute.

The identity of the requesting registrar is derived from the current active session. The identity if the current sponsoring registrar (the registrar that must approve or reject the transfer request) is known by the registry and does not need to be known by the requesting registrar in advance of issuing the transfer request.

The system notifies the potential losing registrar when a domain transfer request has been received using an out-of-band transport such as e-mail and/or transaction reporting. The losing registrar should then approve or reject the transfer. A request to approve or reject a transfer must include an indication of the approval or the rejection. A default approval may be provided if the losing registrar does not approve or reject within a predetermined amount of time.

Approval of a transfer by the current sponsoring registrar results in a change of sponsorship to the original requesting registrar. Approval attempts by any other registrar results in failure of the attempted approval. Rejection of the transfer results in an end to the transfer request with no change in sponsorship. Rejection attempts by any other registrar results in a failure of the attempted rejection. Name servers are implicitly transferred when their parent domain name is transferred.

In one embodiment, a TRANSFER command may affect, for example, the following registry database tables: the domain table, the domain pending transfer table, the transaction table, the transaction attribute table, the registrar table, the e-mail queue table, and the various audit tables that are associated with the aforementioned tables.

Authorized User: All registrars may use the TRANSFER command to request transfer of registration service authority to the requesting registrar. The current sponsoring registrar of a domain name may approve or reject a requested transfer. The registry may implicitly approve or reject requested transfers after a fixed amount of time.

2.4 Response Codes

RRP commands may return a variety of response codes to signify normal completion or error condition. A list of possible error codes follows.

| Code | Description |
| --- | --- |
| 200 | command completed successfully |
| 210 | domain name available |
| 211 | domain name not available |
| 212 | name server name available |
| 213 | name server name not available |
| 220 | command completed successfully. server closing connection |
| 420 | command failed due to server error. server closing connection |
| 421 | command failed due to server error. client should try again |
| 500 | invalid command name |
| 501 | invalid command option |
| 502 | invalid entity value |
| 503 | invalid attribute name |
| 504 | missing required attribute |
| 505 | invalid attribute value syntax |
| 506 | invalid option value |
| 507 | invalid command format |
| 508 | missing required entity |
| 509 | missing command option |
| 520 | server closing connection |
| 521 | too many session open. server closing connection |
| 530 | authentication failed |
| 531 | authorization failed |
| 532 | domain names linked with name server |
| 533 | domain name has active name servers |
| 534 | domain name has not been flagged for transfer |
| 535 | restricted IP address |
| 536 | domain already flagged for transfer |
| 540 | attribute value is not unique |
| 541 | invalid attribute value |
| 542 | invalid old value for an attribute |
| 543 | final or implicit attribute cannot be updated |
| 544 | entity on hold |
| 545 | entity reference not found |
| 546 | credit limit exceeeded |
| 547 | invalid command sequence |
| 548 | domain is not up for renewal |
| 549 | command failed |
| 550 | parent domain not registered |
| 551 | parent domain status does not allow for operation |
| 552 | domain status does not allow for operation |
| 553 | operation not allow. domain pending transfer |
| 554 | domain already registered |
| 555 | domain already renewed |
| 556 | maximum registration period exceeded |

2.5 Status Codes

The status of a domain can be viewed using the RRP STATUS command and modified using the RRP MOD command. Both the registry and the sponsoring registrar may view and change the status of a domain. A domain's status should have a direct bearing on whether or not the domain appears in the appropriate TLD zone file and whether or not the domain can be modified. A domain can have more than one assigned status, e.g., REGISTRAR HOLD and REGISTRAR-LOCK. If a domain is in ACTIVE status, then the domain name can only be in this status. When a registrar sets a domain name to REGISTRAR-LOCK, the registry automatically removes the ACTIVE status. When the registrar removes the REGISTRAR-LOCK and other domain statuses, the registry automatically sets the domain name status to ACTIVE.

A description of the different status codes follows.

ACTIVE: This is the default status of a domain at registration time. The registry sets the domain to this status. The domain is modifiable by the registrar and can be renewed. The domain is included in the zone file when in this status if the domain has an associated name server.

REGISTRY-LOCK: The registry sets the domain to this status. The domain cannot be modified or deleted by the registrar. The registry must remove this status for the registrar to modify the domain. The domain can be renewed. The domain is included in the zone file when in this status if the domain has an associated name server.

REGISTRY-HOLD: The registry sets the domain to this status. The domain cannot be modified or deleted by the registrar. The registry must remove this status for the registrar to modify the domain. The domain can be renewed. The domain is not included in the zone file when in this status.

REGISTRAR-HOLD: The registrar of the domain sets the domain to this status. The domain cannot be modified or deleted when in this status. The registrar must remove this status to modify the domain. The domain can be renewed. The domain is not included in the zone file when in this status.

REGISTRAR-LOCK: The registrar of the domain sets the domain to this status. The domain cannot be modified or deleted when in this status. The registrar must remove this status to modify the domain. The domain can be renewed. The domain is included in the zone file when in this status.

REGISTRY-DELETE-NOTIFY: A domain is set on this status if it has expired and has child name servers that are hosting other domains. Only the registry may set this status. The domain is included in the zone file when in this status if the domain has at least one associated name server.

3. Example Session

A typical session between an RRP client (e.g., registrar) and an RRP server (e.g., registry) follows (registry responses are presented in italics).

A registrar initially authenticates an RRP connection.

```
session
-Id:registrarA
-Password:--am-registrarA
.
200 command completed successfully
.
```

The registrar checks the availability of a domain name in the registry.

```
check
Entity Name:Domain
Domain Name:example.com
.
210 domain name available
.
```

The registrar registers the domain name in the registry.

```
add
Entity Name:Domain
Domain Name:example.com
Name Server:ns1.registrarA.com
NameServer:ns2.registrarA.com
.
200 command completed successfully
Registration Expiration Date: 2000-12-23 10:03:00.000
.
```

The registrar transfers the registrar of a domain name to itself from another registrar.

```
transfer
Entity Name:Domain
Domain Name:example2.com
.
200 command completed successfully
Registration Expiration Date: 2000-12-23 10:03:00.000
.
```

The registrar closes the RRP connection.

```
quit
.
220 command completed successfully. server closing connection
.
```

While the present invention has been described in connection with a preferred embodiment, many modifications will be readily apparent to those skilled in the art, and this application is intended to cover any adaptations or variations thereof. For example, the present invention may be utilized for business cards that have multiple web pages as opposed to a single web page. One skilled in the art will appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. This invention should be limited only by the claims and equivalents thereof.

What is claimed is:

1. A method for processing a domain name registration operation in a shared registration system comprising the steps of:

receiving a registry-registrar protocol (RRP) request for performing a domain name registration operation from a registrar;
parsing the request;
determining whether the registrar that sent the request is authorized to perform an action necessitated by the operation;
if the registrar is authorized, performing the operation;
storing changes necessitated by the operation in a domain name registry; and
sending a RRP response to the registrar, the response indicating success or failure of the operation.

2. The method of claim 1, wherein the request includes a command name and an entity block.

3. The method of claim 2, wherein the entity block includes an indication as to whether the operation pertains to a domain name or a name server.

4. The method of claim 1, further comprising:
determining whether the request is valid before the determining step.

5. The method of claim 1, wherein the operation enables a registrar to register a domain name or a name server.

6. The method of claim 1, wherein the operation enables a registrar to determine whether a domain name or name server has previously been registered.

7. The method of claim 1, wherein the operation enables a registrar to delete the registration of a domain name or delete a name server.

8. The method of claim 1, wherein the operation enables a registrar to update a registered domain name or name server.

9. The method of claim 1, wherein the operation enables a registrar to close a connection with the registry.

10. The method of claim 1, wherein the operation enables a registrar to re-register a domain name.

11. The method of claim 1, wherein the operation enables a registrar to authenticate a connection with the registry.

12. The method of claim 1, wherein the operation allows a registrar to determine the current status of a domain name or name server.

13. The method of claim 1, wherein the operation allows a registrar to request transfer of domain name sponsorship from a second registrar and to approve or reject transfer requests initiated by other registrars.

14. The method of claim 1, wherein the operation allows a registrar to request transfer of domain name sponsorship from a second registrar and to approve or reject transfer requests initiated by other registrars.

15. A computer-readable storage medium storing instructions which, when executed by a processor, cause the processor to perform a method comprising:

receiving a registry-registrar protocol (RRP) request for performing a domain name registration operation from a registrar;
parsing the request;
determining whether the registrar that sent the request is authorized to perform an action necessitated by the operation;
if the registrar is authorized, performing the operation;
storing changes necessitated by the operation in a domain name registry; and
sending a RRP response to the registrar, the response indicating success or failure of the operation.

* * * * *